(12) United States Patent
Sarfare et al.

(10) Patent No.: US 11,269,744 B2
(45) Date of Patent: Mar. 8, 2022

(54) NETWORK STORAGE FAILOVER SYSTEMS AND ASSOCIATED METHODS

(71) Applicant: NETAPP, INC., Sunnyvale, CA (US)

(72) Inventors: Parag Sarfare, San Jose, CA (US); Ananthan Subramanian, San Ramon, CA (US); Szu-Wen Kuo, Taipei (TW); Asif Imtiyaz Pathan, Sunnyvale, CA (US); Santhosh Selvaraj, San Jose, CA (US); Nikhil Mattankot, Pleasanton, CA (US); Manan Patel, Sunnyvale, CA (US); Travis Ryan Grusecki, Santa Clara, CA (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 16/855,837

(22) Filed: Apr. 22, 2020

(65) Prior Publication Data
US 2021/0334179 A1    Oct. 28, 2021

(51) Int. Cl.
*G06F 11/20* (2006.01)
*G06F 11/14* (2006.01)

(52) U.S. Cl.
CPC ...... *G06F 11/2069* (2013.01); *G06F 11/1435* (2013.01); *G06F 11/1451* (2013.01);
(Continued)

(58) Field of Classification Search
CPC ............. G06F 11/1435; G06F 11/1448; G06F 11/1451; G06F 11/1458; G06F 11/1469;
(Continued)

(56) References Cited

U.S. PATENT DOCUMENTS

| 9,021,303 | B1 * | 4/2015 | DeSouter ............ G06F 11/1417 714/20 |
| 9,501,542 | B1 | 11/2016 | Natanzon |

(Continued)

OTHER PUBLICATIONS

Sauer, C., Graefe, G. & Härder, T., (2015). Single-pass restore after a media failure. In: Seidl, T., Ritter, N., Schöning, H., Sattler, K.-U., Härder, T., Friedrich, S. & Wingerath, W. (Hrsg.), Datenbanksysteme für Business, Technologie und Web (BTW2015). Bonn: Gesellschaft für Informatik e.V. (Year: 2015).*

(Continued)

*Primary Examiner* — Bryce P Bonzo
*Assistant Examiner* — Albert Li
(74) *Attorney, Agent, or Firm* — Klein, O'Neill & Singh, LLP

(57) ABSTRACT

Failover methods and systems for a networked storage environment are provided. A filtering data structure and a metadata data structure are generated before starting a replay of a log stored in a non-volatile memory of a second storage node, during a failover operation initiated in response to a failure at a first storage node. The second storage node operates as a partner node of the first storage node to mirror at the log one or more write requests received by the first storage node prior to the failure, and data associated with the one or more write requests. The filtering data structure identifies each log entry and the metadata structure stores a metadata attribute of each log entry. The filtering data structure and the metadata structure are used for providing access to a logical storage object during the log replay from the second storage node.

20 Claims, 20 Drawing Sheets

(52) U.S. Cl.
CPC ...... *G06F 11/1458* (2013.01); *G06F 11/1471* (2013.01); *G06F 2201/80* (2013.01)

(58) Field of Classification Search
CPC ............. G06F 11/1471; G06F 11/2023; G06F 11/2056; G06F 11/2064; G06F 11/2069; G06F 11/2079; G06F 11/2097; G06F 16/2365; G06F 16/2358; G06F 16/27; G06F 16/2379; G06F 16/273; G06F 11/2092
See application file for complete search history.

(56) References Cited

U.S. PATENT DOCUMENTS

| | | | |
|---|---|---|---|
| 10,114,581 B1* | 10/2018 | Natanzon | G06F 3/065 |
| 10,545,913 B1 | 1/2020 | Liao et al. | |
| 10,922,009 B2 | 2/2021 | Yudenfriend et al. | |
| 2015/0089172 A1 | 3/2015 | Kulkarni | |
| 2015/0120659 A1* | 4/2015 | Srivastava | G06F 11/2038 707/625 |
| 2015/0261633 A1 | 9/2015 | Usgaonkar et al. | |
| 2015/0370644 A1* | 12/2015 | Graefe | G06F 11/1469 707/624 |
| 2016/0127467 A1 | 5/2016 | Mu et al. | |
| 2016/0342486 A1* | 11/2016 | Kedem | G06F 11/1471 |
| 2017/0132095 A1* | 5/2017 | Graefe | G06F 11/1662 |
| 2017/0300250 A1 | 10/2017 | Sterns et al. | |
| 2018/0144015 A1 | 5/2018 | Mittur Venkataramanappa et al. | |
| 2018/0284995 A1 | 10/2018 | Dantkale et al. | |
| 2018/0300204 A1* | 10/2018 | Amirishetty | G06F 11/1471 |
| 2018/0336229 A1 | 11/2018 | Muehle et al. | |
| 2019/0005262 A1 | 1/2019 | Surla et al. | |
| 2019/0007206 A1 | 1/2019 | Surla et al. | |
| 2021/0250400 A1 | 8/2021 | Chu et al. | |

OTHER PUBLICATIONS

Goetz Graefe. 2015. Instant recovery for data center savings. SIGMOD Rec. 44, 2 (Jun. 2015), 29-34. DOI:https://doi.org/10.1145/2814710.2814716 (Year: 2015).*

NETAPP; Clustered Data ONTAP 8.3 High-Availability Configuration Guide; NetApp; Inc.; Mar. 2015; 143 pages.

Non-Final Office Action in co-pending US application (U.S. Appl. No. 16/855,853) dated Aug. 19, 2021.

Non-Final Office Action on co-pending US application (U.S. Appl. No. 16/855,870) dated Oct. 1, 2021.

Google Scholar/Patents—text refined (Year: 2021).

Notice of Allowance on co-pending US application (U.S. Appl. No. 16/855,853) dated Oct. 15, 2021.

* cited by examiner

| Location Data Structure 536 | | |
|---|---|---|
| Data Container Identifier 540A | Offset (FBN) 541A | Data Location 542A |
| ⋮ | ⋮ | ⋮ |
| Data Container Identifier 540N | Offset (FBN) 541N | Data Location 542N |

FIG. 5C

NETWORK STORAGE FAILOVER SYSTEMS AND ASSOCIATED METHODS

TECHNICAL FIELD

The present disclosure relates to networked storage systems, and more particularly, to providing access to storage of a failed storage system node by a partner storage system node, during a failover operation.

BACKGROUND

Various forms of storage systems are used today. These forms include direct attached storage, network attached storage (NAS) systems, storage area networks (SANs), and others. Storage systems are commonly used for a variety of purposes, such as providing multiple users with access to shared data, backing up data and others.

A storage system typically includes at least one computing system (may also be referred to as a "server", "storage server", "storage node", "storage system node" or "storage controller") executing a storage operating system configured to store and retrieve data on behalf of one or more computing systems at one or more storage devices. The storage operating system exports data stored at storage devices as a storage volume.

To provide redundancy in networked storage systems, a first storage system node and a second storage system node are typically configured to operate as partner nodes. This means that all write operations managed by the first storage system node are mirrored at the second storage system node (and vice versa). If the first storage system node fails, then the second storage system node takes over the storage of the failed first storage system node by executing a failover (also referred to as "takeover" throughout this specification) operation. Conventional systems often limit access to the storage of the failed storage system node during the failover operation. This delays processing of input/output ("I/O") requests received during the failover operation directed towards the storage of the failed storage system node, and hence is undesirable. It is desirable to reduce disruption in accessing storage of a failed storage system node.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate but not to limit the present disclosure. The drawings include the following Figures:

FIG. 5C shows an example of a location data structure used during a failover operation involving at least two storage system nodes, according to aspects of the present disclosure;

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be but is not limited to being, a process running on a hardware processor, a hardware processor, an object, an executable, a thread of execution, a program, and/or a computer.

By way of illustration both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, storage class memory, solid state drive, EEPROM (electrically erasable programmable read only memory), memory stick or any other storage device type, in accordance with the claimed subject matter.

In one aspect, computing technology is disclosed herein to reduce disruption in accessing storage of a failed storage system node during a failover operation. As described below in more detail, the disclosed computing technology efficiently processes read and write requests associated with the storage of the failed storage system node, while the failover operation is in progress at a partner storage system node. This reduces disruption for client systems that access the storage to read and write data and improves the overall computing ability of the partner storage system node to service read and write requests.

Figure 1A:
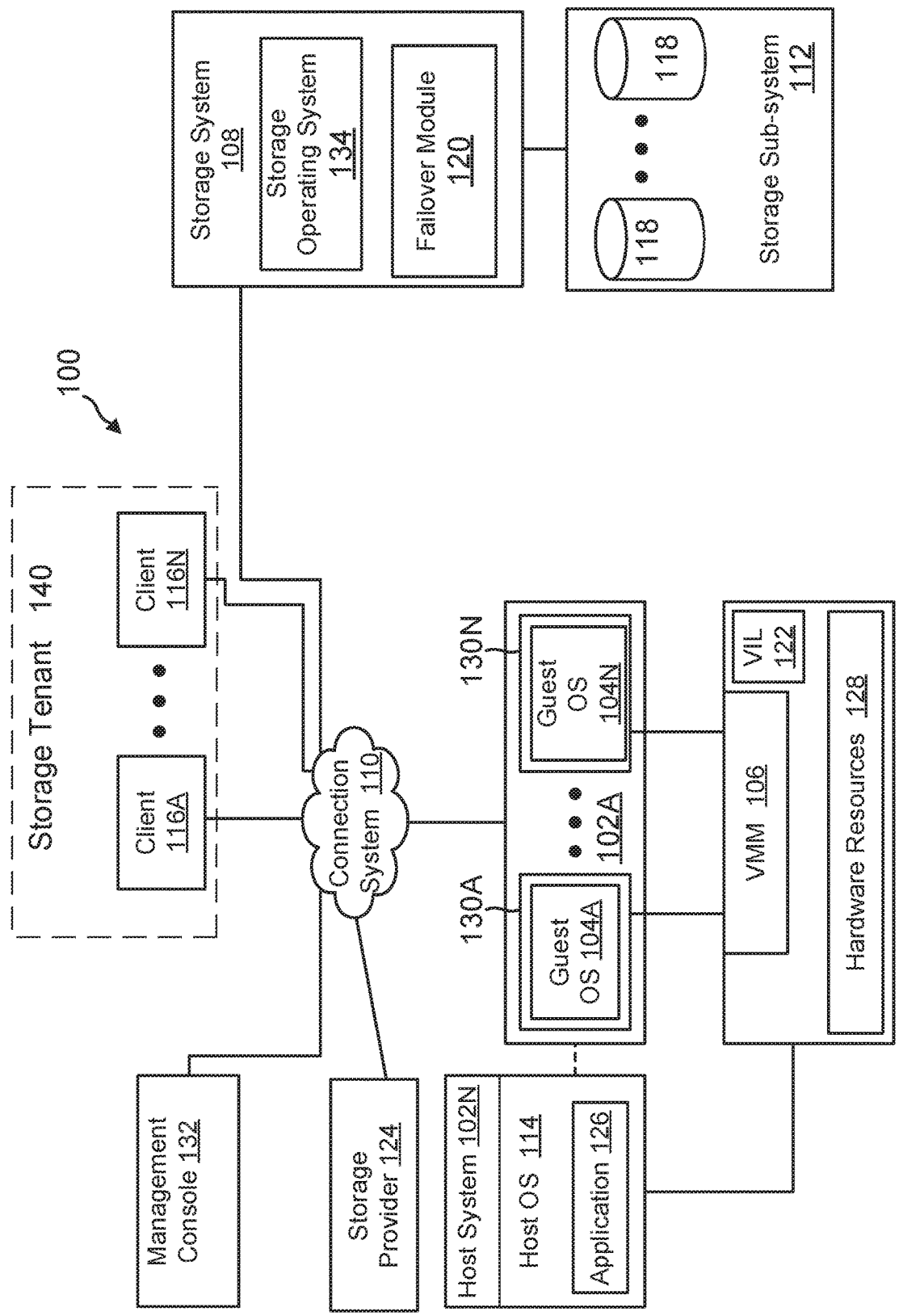
FIG. 1A shows an example of an operating environment for aspects of the present disclosure.

System 100:

FIG. 1A shows an example of a networked storage environment 100 (also referred to as system 100) for implementing the various adaptive aspect of the present disclosure. System 100 may include a plurality of computing devices 102A-102N (may also be referred to as a "host system 102," "host systems 102", "computing device 102", "computing devices 102". "server 102" or "servers 102") communicably coupled via a connection system 110 (e.g. a local area network (LAN), wide area network (WAN), the Internet and others) to a storage system 108 (may also be referred to as "storage server 108", "storage controller 108". "storage node 108", "storage nodes 108". "storage system node 108" or "storage system nodes 108") that executes a storage operating system 134 for storing and retrieving data to and from a storage subsystem 112 having mass storage devices 118. Although only a single storage system 108 is shown in FIG. 1A, according to aspects of the present disclosure, system 100 includes a plurality of storage systems 108 arranged in one or more high-availability pairs (see FIG. 1B) for a failover operation. The storage system 108 also executes a failover module 120 for managing a failover operation to provide access to the storage system 108 during the failover operation, described below in detail. As used herein, the term "communicably coupled" may refer to a direct connection, a network connection, or other connections to enable communication between devices.

As an example host system 102A may execute a plurality of virtual machines (VMs) in a virtual environment that is described below in detail. Host 102N may execute one or more application 126, for example, a database application, an email application or any other application type that uses the storage system 108 to store information in storage devices 118. Host 102N executes an operating system 114, for example, a Windows based operating system, Linux, Unix and others (without any derogation of any third party trademark rights) to control the overall operations of host 102N.

Clients 116A-116N are computing devices that can access storage space at the storage system 108 via the connection system 110. A client can be the entire system of a company a department, a project unit or any other entity. Each client is uniquely identified and, optionally, may be a part of a logical structure called a storage tenant 140. The storage tenant 140 represents a set of users (may be referred to as storage consumers) for a storage provider 124 (may also be referred to as a cloud manager where cloud computing is utilized) that provides access to storage system 108. It is noteworthy that the adaptive aspects of the present disclosure are not limited to using a storage provider or a storage tenant, and instead may be implemented for direct client access.

In one aspect, the storage operating system 134 has access to mass storage devices 118 of storage subsystem 112. The mass storage devices 118 may include solid state drives (SSDs), storage class memory, writable storage device media such as hard disk drives (HDD), magnetic disks, video tape, optical. DVD, magnetic tape, and/or any other similar media adapted to store electronic information. The storage devices 118 may be organized as one or more groups of Redundant Array of Independent (or Inexpensive) Disks (RAID). The various aspects disclosed are not limited to any specific storage device type or storage device configuration.

As an example, the storage operating system 134 may provide a set of logical storage volumes (or logical unit numbers (LUNs)) that present storage space to host systems 102 clients 116, and/or VMs (e.g. 130A/130N, described below) for storing information. Each volume may be configured to store data containers (e.g. files, directories, structured or unstructured data, or data objects), scripts word processing documents executable programs and any other type of structured or unstructured data. From the perspective of one of the client systems, each volume can appear to be a single drive. However, each volume can represent storage space at one storage device, an aggregate of some or all of the storage space in multiple storage devices, a RAID group or any other suitable set of storage space.

An example of storage operating system 134 is the Data ONTAP® storage operating system available from NetApp, Inc. that implements a Write Anywhere File Layout (WAFL®) file system (without derogation of any trademark rights of NetApp Inc.). The various aspects disclosed herein are not limited to any specific file system type and maybe implemented by other file systems and storage operating systems.

The storage operating system 134 organizes storage space at the storage subsystem 112 as one or more "aggregate", where each aggregate is identified by a unique identifier and a location. Within each aggregate one or more storage volumes are created whose size can be varied. A qtree, sub-volume unit may also be created within the storage volumes. As a special case, a qtree may be an entire storage volume.

The storage system 108 may be used to store and manage information at storage devices 118. A request to store or read data may be based on file-based access protocols for example, the Common Internet File System (CIFS) protocol or Network File System (NFS) protocol, over TCP/IP (Transmission Control Protocol/Internet Protocol). Alternatively, the request may use block-based access protocols, for example, iSCSI (Internet Small Computer Systems Interface) and SCSI encapsulated over Fibre Channel (FCP). The term file/files as used herein include data container/data containers, directory/directories, and/or data object/data objects with structured or unstructured data.

Figure 2A:
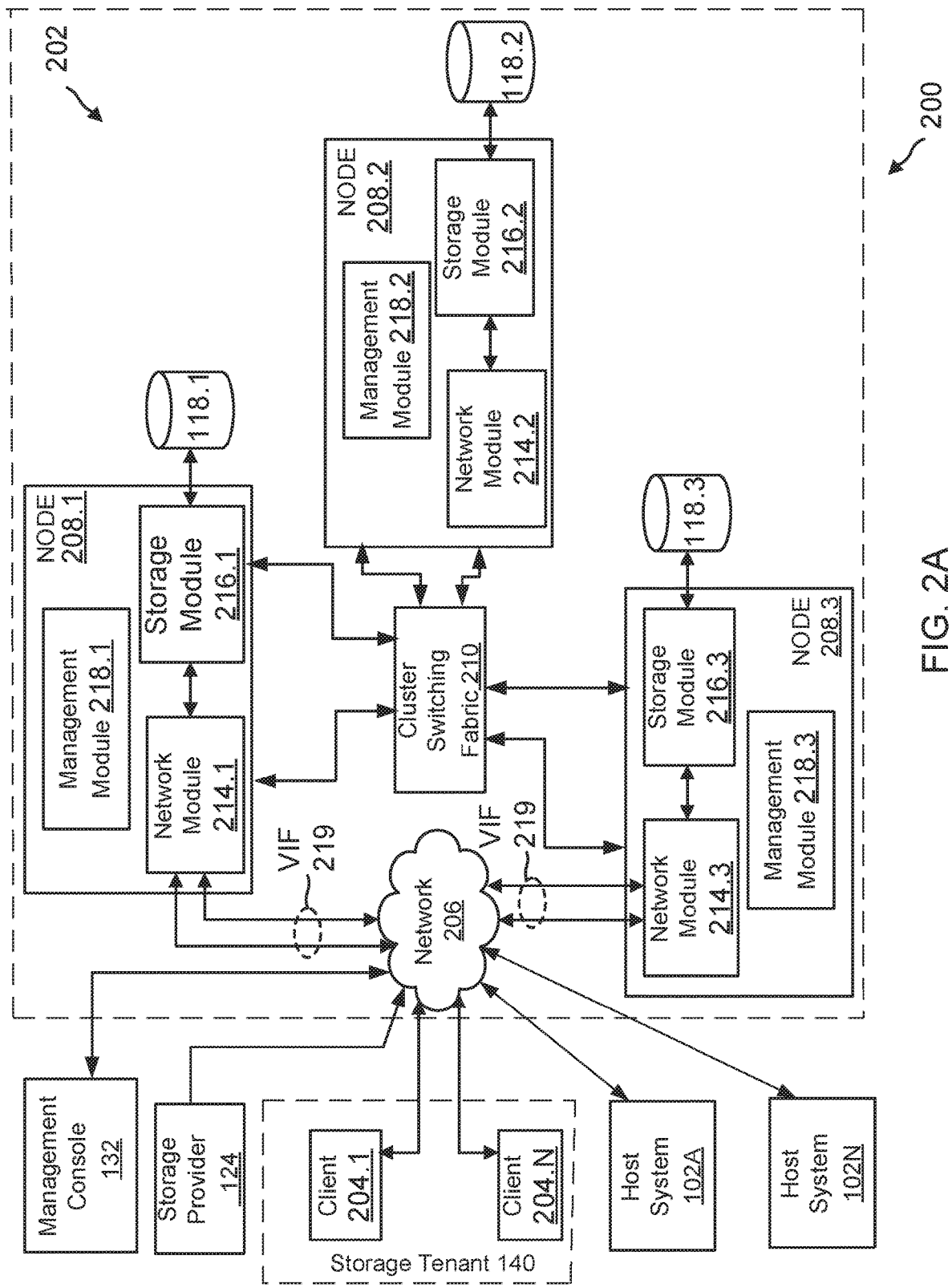
FIG. 2A shows an example of a clustered storage system with a plurality of storage system nodes, used according to aspects of the present disclosure.
Figure 2B:
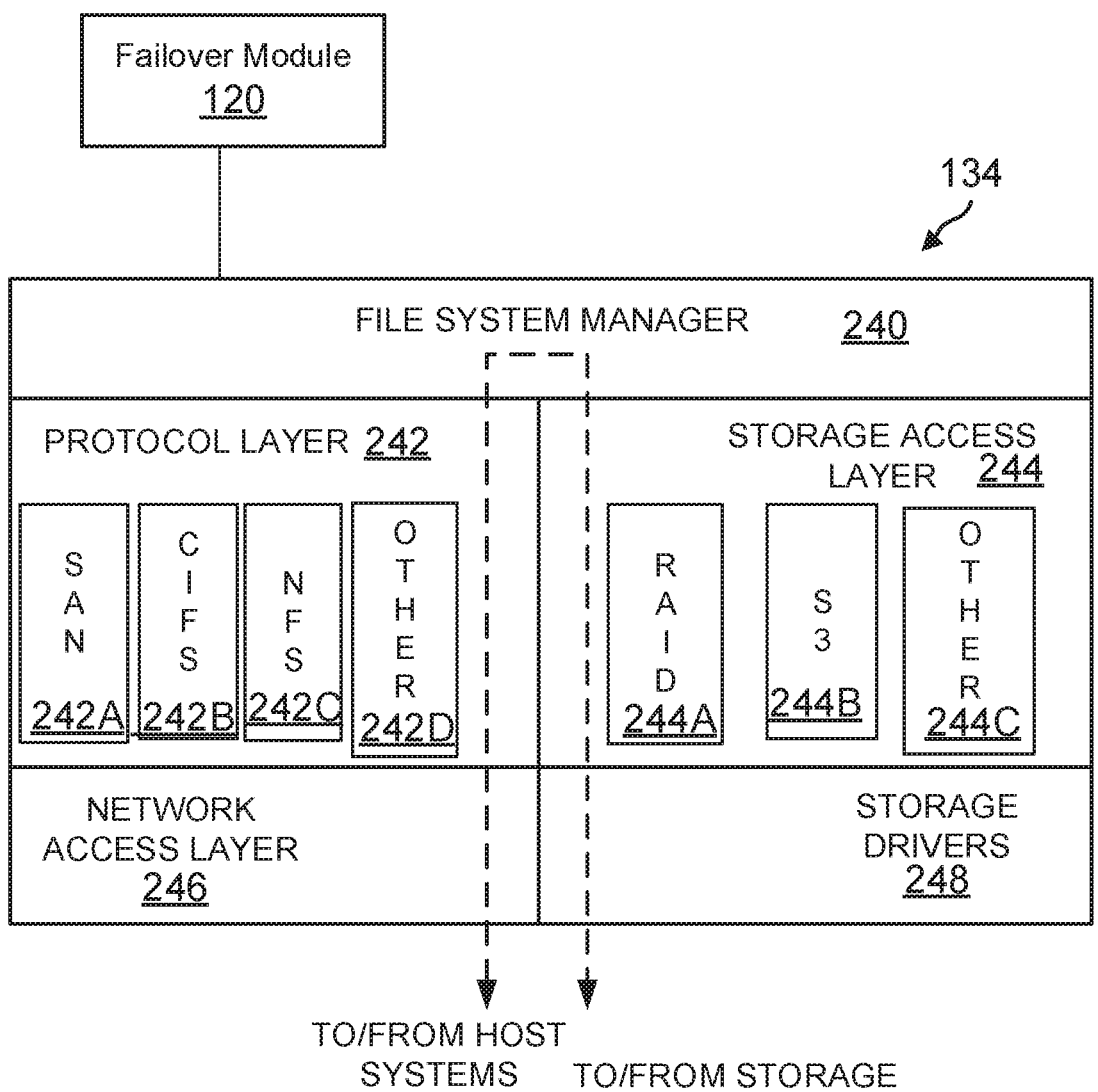
FIG. 2B shows an example of a storage operating system executed by a storage system node, according to aspects of the present disclosure.

To facilitate access to storage space, the storage operating system 134 implements a file system (also referred to as file system manager e.g. the file system manager 240 shown in FIG. 2B) that logically organizes stored information as a hierarchical structure for files/directories/objects at the storage devices. Each "on-disk" file may be implemented as a set of data blocks configured to store information, such as text, whereas a directory may be implemented as a specially formatted file in which other files and directories are stored. The data blocks are organized within a volume block number (VBN) space that is maintained by the file system, described below in detail. The file system may also assign each data block in the file a corresponding "file offset" or file block number (FBN). The file system typically assigns sequences of FBNs on a per-file basis, whereas VBNs are assigned over a larger volume address space. The file system organizes the data blocks within the VBN space as a logical volume. The file system typically consists of a contiguous range of VBNs from zero to n, for a file system of size n–1 blocks.

The storage operating system 134 may further implement a storage module (for example, a RAID system for the storage subsystem 112) that manages the storage and retrieval of the information to and from storage devices 118 in accordance with input/output (I/O) operations. When accessing a block of a file in response to servicing a client request, the file system specifies a VBN that is translated at the file system/RAID system boundary into a disk block number ("DBN") (or a physical volume block number ("PVBN") location on a particular storage device (storage device, DBN) within a RAID group of the physical volume). Each block in the VBN space and in the DBN space is typically fixed, e.g., 4k bytes (kB), in size; accordingly, there is typically a one-to-one mapping between the information stored on the storage devices in the DBN space and the information organized by the file system in the VBN space.

A requested block is retrieved from one of the storage devices 118 and stored in a buffer cache (e.g. 140, FIG. 1B) of a memory of the storage system 108 as part of a buffer tree (e.g. 400, FIG. 4) of the file. The buffer tree is an internal representation of blocks for a file stored in the buffer cache and maintained by the file system. Broadly stated and as described below in detail, the buffer tree has an inode at the root (top-level) of the file, as described below.

An inode is a data structure used to store information, such as metadata, about a file, whereas the data blocks are structures used to store the actual data for the file. The information in an inode may include. e.g., ownership of the file file modification time (referred to as "mtime"), access permission for the file, size of the file file type and references to locations on storage devices 118 of the data blocks for the file. The references to the locations of the file data are provided by pointers, which may further reference indirect blocks (e.g. 404, FIG. 4) that, in turn, reference the data blocks (e.g. 406, FIG. 4) depending upon the amount of data in the file. Each pointer may be embodied as a VBN to facilitate efficiency among the file system and the RAID system when accessing the data.

Volume information ("volinfo") and file system information ("fsinfo") blocks specify the layout of information in the file system, the latter block including an inode of a file that includes all other inodes of the file system (the inode file). Each logical volume (file system) has an fsinfo block that is preferably stored at a fixed location, e.g., at a RAID group. The inode of the fsinfo block may directly reference (or point to) blocks of the inode file or may reference indirect blocks of the inode file that, in turn, reference direct blocks of the inode file. Within each direct block of the inode file are embedded inodes, each of which may reference indirect blocks that, in turn, reference data blocks (also mentioned as "L0" blocks) of a file. An example of an inode and a buffer tree are described below with respect to FIG. 4.

In a typical mode of operation, a computing device (e.g. host system 102 client 116 or any other device) transmits one or more I/O requests over connection system 110 to the storage system 108. Storage system 108 receives the I/O requests issues one or more I/O commands to storage devices 118 to read or write data on behalf of the computing device, and issues a response containing the requested data over the network 110 to the respective client system.

As mentioned above, system 100 may also include a virtual machine environment where a physical resource is time-shared among a plurality of independently operating processor executable virtual machines (VMs). Each VM may function as a self-contained platform running its own operating system (OS) and computer executable application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host system) which may be referred to herein as "host hardware resources". The host hardware resources may include one or more processors resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

As shown in FIG. 1A, host system 102A includes/provides a virtual machine environment executing a plurality of VMs 130A-130N (also referred to as VM 130 or VMs 130) that may be presented to client computing devices/systems 116A-116N. VMs 130 execute a plurality of guest OS 104A-104N (may also be referred to as guest OS 104) that share hardware resources 128. Application 126 may also be executed within VMs 130 to access the storage system 108. As described above, hardware resources 128 may include storage, CPU, memory, I/O devices or any other hardware resource.

In one aspect host system 102A interfaces with or includes a virtual machine monitor (VMM) 106, for example, a processor executed Hyper-V layer provided by Microsoft Corporation of Redmond. Wash., a hypervisor layer provided by VMWare Inc., or any other type (without derogation of any third party trademark rights). VMM 106 presents and manages the plurality of guest OS 104A-104N executed by the host system 102A. The VMM 106 may include or interface with a virtualization layer (VIL) 122 that provides one or more virtualized hardware resource to each OS 104A-104N.

In one aspect, VMM 106 is executed by host system 102A with VMs 130. In another aspect, VMM 106 may be executed by an independent stand-alone computing system, referred to as a hypervisor server or VMM server and VMs 130 are presented at one or more computing systems.

It is noteworthy that different vendors provide different virtualization environments, for example, VMware Corporation. Microsoft Corporation and others. Data centers may have hybrid virtualization environments/technologies, for example, Hyper-V and hypervisor based virtual environments. The generic virtualization environment described above with respect to FIG. 1A may be customized to implement the various aspects of the present disclosure. Furthermore, VMM 106 (or VIL 122) may execute other modules, for example, a storage driver, network interface and others. The virtualization environment may use different hardware and software components and it is desirable for one to know an optimum/compatible configuration.

In one aspect, system 100 uses a management console 132 for configuring and managing the various components of system 100. As an example, the management console 132 may be implemented as or include one or more application programming interfaces (APIs) that are used for managing one or more components of system 100. The APIs may be implemented as REST APIs, where REST means "Representational State Transfer". REST is a scalable system used for building web services. REST systems/interfaces may use HTTP (hyper-text transfer protocol) or other protocols for communicating with one or more devices of system 100.

Although storage system 108 is shown as a stand-alone system, i.e. a non-cluster based system, in another aspect storage system 108 may have a distributed architecture; for example, a cluster based storage system that is described below in detail with respect to FIG. 2A.

Figure 1B:
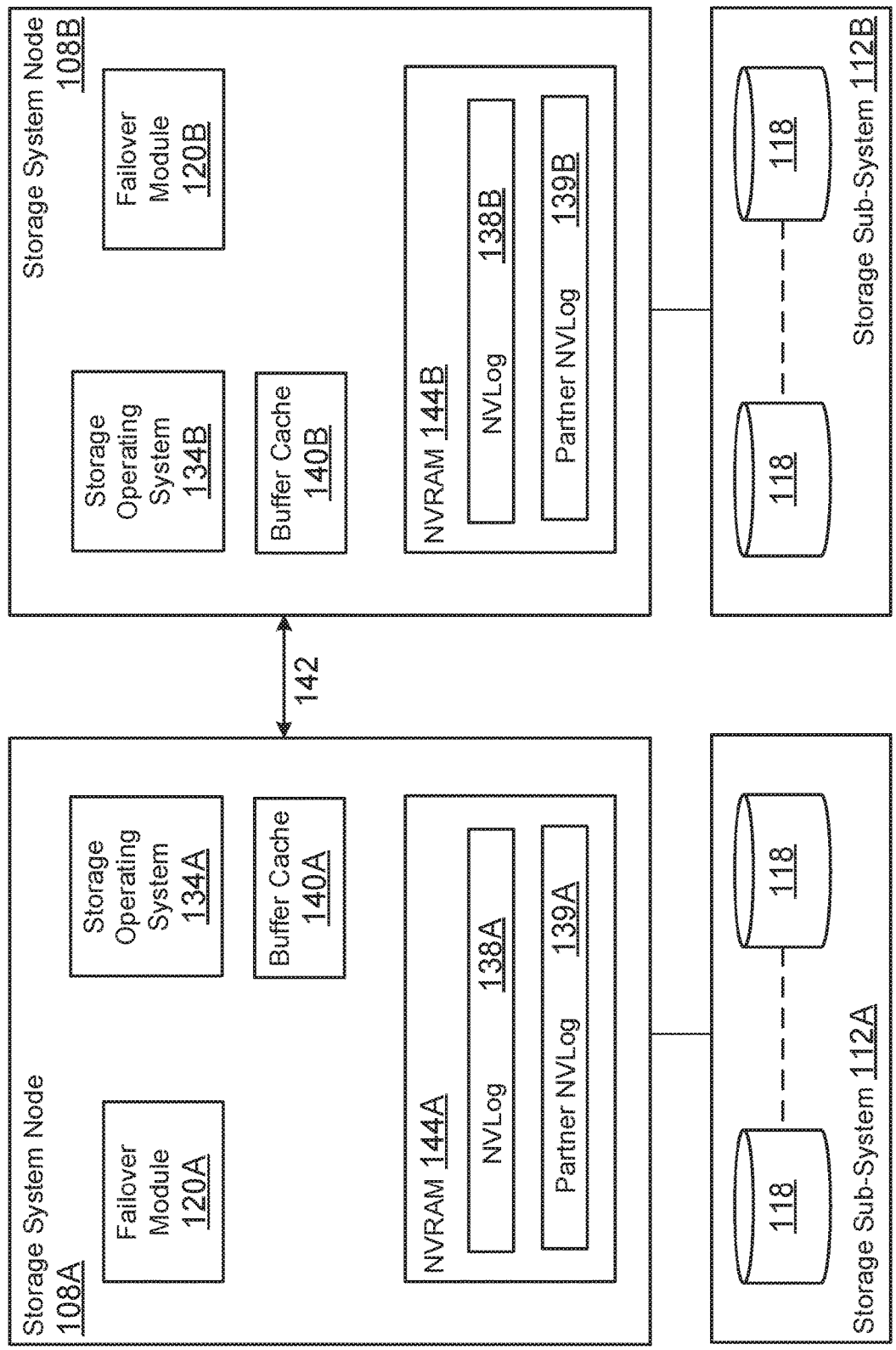
FIG. 1B shows an example of two storage system nodes operating as partner nodes, according to aspects of the present disclosure.

High-Availability Pair:

FIG. 1B shows an example of storage system nodes 108A/108B connected by a link 142 (e.g. a communication link or any other interconnect type) configured to operate as partner nodes. This means that any data written by one storage system node (e.g. 108A) is mirrored at the partner storage system node (e.g. 108B). If one storage system node fails (e.g. 108A), then the other partner storage system node (e.g. 108B) takes over the storage volumes/LUNs of the failed storage system node during a failover operation that is also referred to as a "takeover operation".

Each storage system node 108A/108B executes the storage operating system 134 (shown as 134A for the storage system node 108A, and 134B for the storage system node 108B). The storage operating system 134 uses a volatile, buffer cache 140 (shown as buffer cache 140A for storage system 108A, and buffer cache 140B for storage system 140B) for managing write and read requests.

To protect against failures, each storage system node uses a non-volatile random access memory (NVRAM) 144 (shown as NVRAM 144A for the storage system node 108A, and NVRAM 144B for the storage system node 108B) that persistently stores a log, referred to as "NVLog", to track each write operation that is being processed by the buffer cache 140 of each storage system node at any given time. For example, NVLog 138A tracks all the write operations that are buffered in buffer cache 140A of storage system node 108A. A partner NVLog 139A tracks all the write operations that are being processed by the partner storage system node 108B at buffer cache 140B. Similarly, the NVLog 138B tracks all the write operations that are buffered in buffer cache 140B, and the partner NVLog 139B tracks all the write operations of buffer cache 140A that are being processed by the storage system node 108A at any given time. Although for clarity, NVLogs 138A/138B and partner NVLogs 139A/139B are shown as separate logical structures within NVRAMs 144A/144B, the adaptive aspects of the present disclosure maybe implemented by maintaining a single NVLog at each storage system node to track the write operations processed by each node.

During a failover operation before the storage volumes of a failed storage system node (e.g. 108A) can be made available to incoming read and write requests a partner storage system node (e.g. 108B) replays (i.e. processes) all the entries mirrored in the partner NVLog 139B to ensure that all the mirrored write requests at the time of failure are executed. The failover operation is managed by the failover module 120 (i.e. 120A for the storage system node 108A and 120B for the storage system 108B) interfacing with the storage operating system 134. It is noteworthy that the failover module 120 may be integrated with the storage operating system 134.

In conventional systems, while the NVLog replay of the failed node is being executed by the partner storage system node during a failover operation, the storage (i.e. logical and/or physical storage) of the failed node becomes unavailable to client devices. This is undesirable since client devices are unable to use the storage of the failed storage system node. The innovative computing technology described herein make the storage available during partner NVLog replay, as described below in detail.

Clustered Storage System:

Before describing the various aspects of the present disclosure, the following describes a clustered based networked storage environment. FIG. 2A shows a cluster-based storage environment 200 having a plurality of storage system nodes operating to store data on behalf of clients at storage subsystem 112. The various storage system nodes may be configured to operate as partner nodes, described above with respect to FIG. 1B.

Storage environment 200 may include a plurality of client systems 204.1-204.N (may also be referred to as "client system 204" or "client systems 204") as part of or associated with storage tenant 140, a clustered storage system 202 (similar to storage system 108) and at least a network 206 communicably connecting the host system 102A-102N, client systems 204.1-204.N, the management console 132, the storage (or cloud) provider 124 and the clustered storage system 202. It is noteworthy that these components may interface with each other using more than one network having more than one network device.

The clustered storage system 202 includes a plurality of storage system nodes 208.1-208.3 (also referred to as "node 208" or "nodes 208"), a cluster switching fabric 210, and a plurality of mass storage devices 118.1-118.3 (similar to 118, FIG. 1A). The nodes 208.1-208.3 can be configured as high-availability pair nodes to operate as partner nodes, as shown in FIG. 1B. For example node 208.1 and 208.2 may operate as partner nodes. If node 208.1 fails node 208.2 takes over the storage volumes that are exposed by node 208.1 during a failover operation.

Each of the plurality of nodes 208.1-208.3 is configured to include a network module, a storage module, and a management module, each of which can be implemented as a processor executable module. Specifically, node 208.1 includes a network module 214.1, a storage module 216.1 and a management module 218.1 node 208.2 includes a network module 214.2 a storage module 216.2, and a management module 218.2, and node 208.3 includes a network module 214.3 a storage module 216.3, and a management module 218.3.

The network modules 214.1-214.3 include functionality that enable the respective nodes 208.1-208.3 to connect to one or more of the host systems 102A-102N, and the client systems 204.1-204.N (or the management console 132) over the computer network 206. The network modules 214.1-214.3 handle file network protocol processing (for example CFS, NFS and/or iSCSI requests). The storage modules 216.1-216.3 connect to one or more of the storage devices and process I/O requests. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices, such as storage devices 118.1-118.3.

A switched virtualization layer including a plurality of virtual interfaces (VIFs) 219 is provided to interface between the respective network modules 214.1-214.3 and the client systems 204.1-204.N, allowing storage space at the storage devices associated with the nodes 208.1-208.3 to be presented to the client systems 204.1-204.N as a single shared storage pool.

The clustered storage system 202 can be organized into any suitable number of storage virtual machines (SVMs) (may be referred to as virtual servers (may also be referred to as "SVMs")), in which each SVM represents a single storage system namespace with separate network access. A SVM may be designated as a resource on system 200. Each SVM has a client domain and a security domain that are separate from the client and security domains of other SVMs. Moreover, each SVM is associated with one or more VIFs 219 and can span one or more physical nodes, each of which can hold one or more VIFs 219 and storage associated with one or more SVMs. Client systems can access the data on a SVM from any node of the clustered system, through the VIF(s) 219 associated with that SVM.

Each of the nodes 208.1-208.3 is defined as a computing system to provide services to one or more of the client systems 204.1-204.N and host systems 102A-102N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules. In another aspect, the clustered storage system 202 may only include one network module and storage module.

Each client system 204.1-204.N may request the services of one of the respective nodes 208.1, 208.2, 208.3 and that node may return the results of the services requested by the client system by exchanging packets over the computer network 206 which may be wire-based, optical fiber, wireless, or any other suitable combination thereof.

Storage Operating System: FIG. 2B illustrates a generic example of the storage operating system 134 of Figure A executed by the storage system node 108 (or nodes 208.1-208.3, FIG. 2A) according to one aspect of the present disclosure. In one example storage operating system 134 may include several modules, or "layers" executed by one or both of network module 214 and storage module 216. These layers include a file system manager 240 that keeps track of a hierarchical structure of the data stored in storage devices 118 and manages read/write operation, i.e. executes read/write operation on storage in response to I/O requests, as described below in detail. The file system manager 240 interfaces with the failover module 120 during a failover operation to enable access to storage managed by a failed storage system node via a partner storage system node, described below in detail.

Storage operating system 134 may also include a protocol layer 242 and an associated network access layer 246, to allow node 208.1 to communicate over a network with other systems, such as clients 204.1/204.N. Protocol layer 242 may implement one or more of various higher-level network protocols, such as SAN (e.g. iSCSI) (242A), CIFS (242B), NFS (242C), Hypertext Transfer Protocol (HTTP) (not shown), TCP/IP (not shown) and others (242D).

Network access layer 246 may include one or more drivers, which implement one or more lower-level protocols to communicate over the network, such as Ethernet. Interactions between host systems and mass storage devices are illustrated schematically as a path which illustrates the flow of data through storage operating system 134.

The storage operating system 134 may also include a storage access layer 244 and an associated storage driver layer 248 to allow storage module 216 to communicate with a storage device. The storage access layer 244 may implement a higher-level storage protocol such as RAID (244A), a S3 layer 244B to access a capacity tier for object based storage (not shown), and other layers 244C. The storage driver layer 248 may implement a lower-level storage device access protocol, such as Fibre Channel or SCSI. The storage driver layer 248 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a storage system node, implement data access semantics of a general-purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly attached to a client or host computer. The term "storage system" should therefore be taken broadly to include such arrangements in addition to any subsystems configured to perform a storage function and associated with other equipment or systems. It should be noted that while this description is written in terms of a write any-where file system, the teachings of the present disclosure may be utilized with any suitable file system, including a write in place file system.

Figure 3:
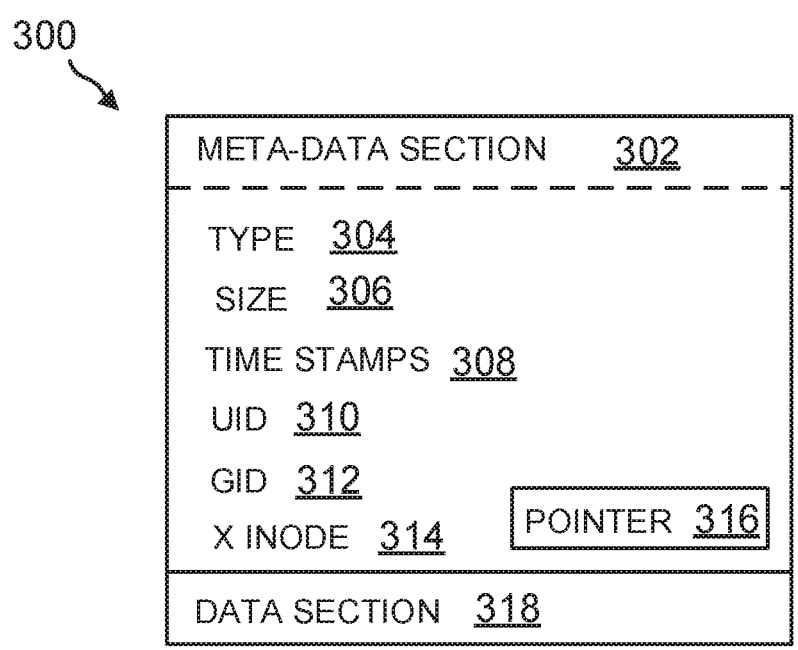
FIG. 3 shows an example of an inode used by a storage system node for storing and retrieving data from a storage device, according to aspects of the present disclosure.

Mode Structure: FIG. 3 shows an example of an inode structure 300 (may also be referred to as inode 300) used to store data on storage devices 118 of the storage subsystem 112, according to one aspect of the present disclosure. Inode 300 may include a meta-data section 302 and a data section 318. The information stored in the meta-data section 302 of each inode 300 describes a file and as such, may include the file type (e.g., regular, directory or object) 304, size 306 of the file, time stamps (e.g., access and/or modification time) 308 for the file and ownership. i.e., user identifier (UID 310) and group ID (GID 312), of the file. The metadata section 302 may also include an X-inode field 314 with a pointer 316 that references another on-disk inode structure containing e.g., access control list (ACL) information associated with the file or directory.

The contents of data section 318 of each inode 300 may be interpreted differently depending upon the type of file (inode) defined within the type field 304. For example, the data section 318 of a directory inode structure includes meta-data controlled by the file system, whereas the data section of a "regular inode" structure includes user-defined data. In this latter case, the data section 318 includes a representation of the data associated with the file. Data section 318 of a regular on-disk inode file may include user data or pointers, the latter referencing for example, 4 KB data blocks for storing user data at a storage device.

Inode structure 300 may have a restricted size (for example, 122 bytes). Therefore, user data having a size that is less than or equal to 64 bytes may be represented, in its entirety, within the data section of an inode. However, if the user data is greater than 64 bytes but less than or equal to, for example 64 kilobytes (KB), then the data section of the inode comprises up to 16 pointers, each of which references a 4 KB block of data stored at a disk. Moreover, if the size of the data is greater than 64 kilobytes but less than or equal to 64 megabytes (MB), then each pointer in the data section 318 of the inode references an indirect inode that contains 1024 pointers, each of which references a 4 KB data block on disk.

Figure 4:
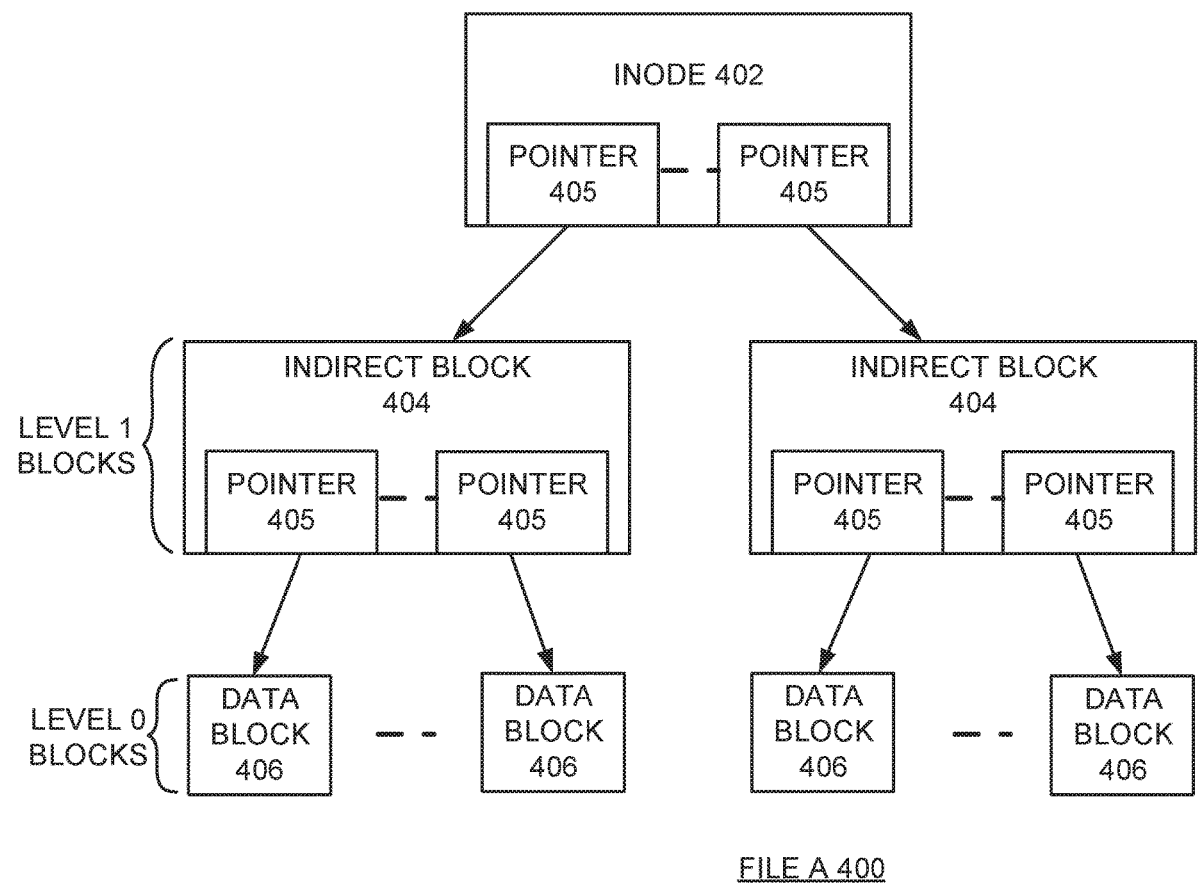
FIG. 4 shows an example of a buffer tree used by a storage operating system of a storage system node, according to aspects of the present disclosure.

Buffer Tree: FIG. 4 is an example of an inode buffer tree of a data container that may be used by the storage operating system 134. The buffer tree is an internal representation of blocks for a data container (e.g., file A 400) loaded into the buffer cache 140 (e.g., of a storage system node 108 as illustrated in FIG. 1B) and maintained by the file system manager 240. A root (top-level) inode 402 such as an embedded inode, references indirect (e.g., Level 1) blocks 404. The indirect blocks (and inode) contain pointers 405 that ultimately reference data blocks 406 used to store the actual data of file A. That is, the data of file A 400 are contained in data blocks and the locations of these blocks are stored in the indirect blocks of the file. Each Level 1 indirect block 404 may contain pointers to many data blocks.

In one aspect, the file system manager 240 allocates blocks, and frees blocks, to and from a virtual volume (may be referred to as VVOL) of an aggregate. The aggregate as mentioned above, is a physical volume comprising one or more groups of storage devices, such as RAID groups, underlying one or more VVOLs of the storage system. The aggregate has its own physical volume block number (PVBN) space and maintains metadata, such as block allocation bitmap structures, within that PVBN space. Each VVOL also has its own virtual volume block number (VVBN) space and maintains metadata, such as block allocation bitmap structures, within that VVBN space. Typically, PVBNs are used as block pointers within buffer trees of files (such as file 400) stored in a VVOL.

As an example a VVOL may be embodied as a container file in an aggregate having L0 (data) blocks that comprise all blocks used to hold data in a VVOL; that is, the L0 data blocks of the container file contain all blocks used by a VVOL. L1 (and higher) indirect blocks of the container file reside in the aggregate and, as such, are considered aggregate blocks. The container file is an internal (to the aggregate) feature that supports a VVOL; illustratively, there is one container file per VVOL. The container file is a hidden file (not accessible to a user) in the aggregate that holds every block in use by the VVOL.

When operating in a VVOL, VVBN identifies a FBN location within the file and the file system uses the indirect blocks of the hidden container file to translate the FBN into a PVBN location within the physical volume, which block can then be retrieved from storage.

Figure 5A:
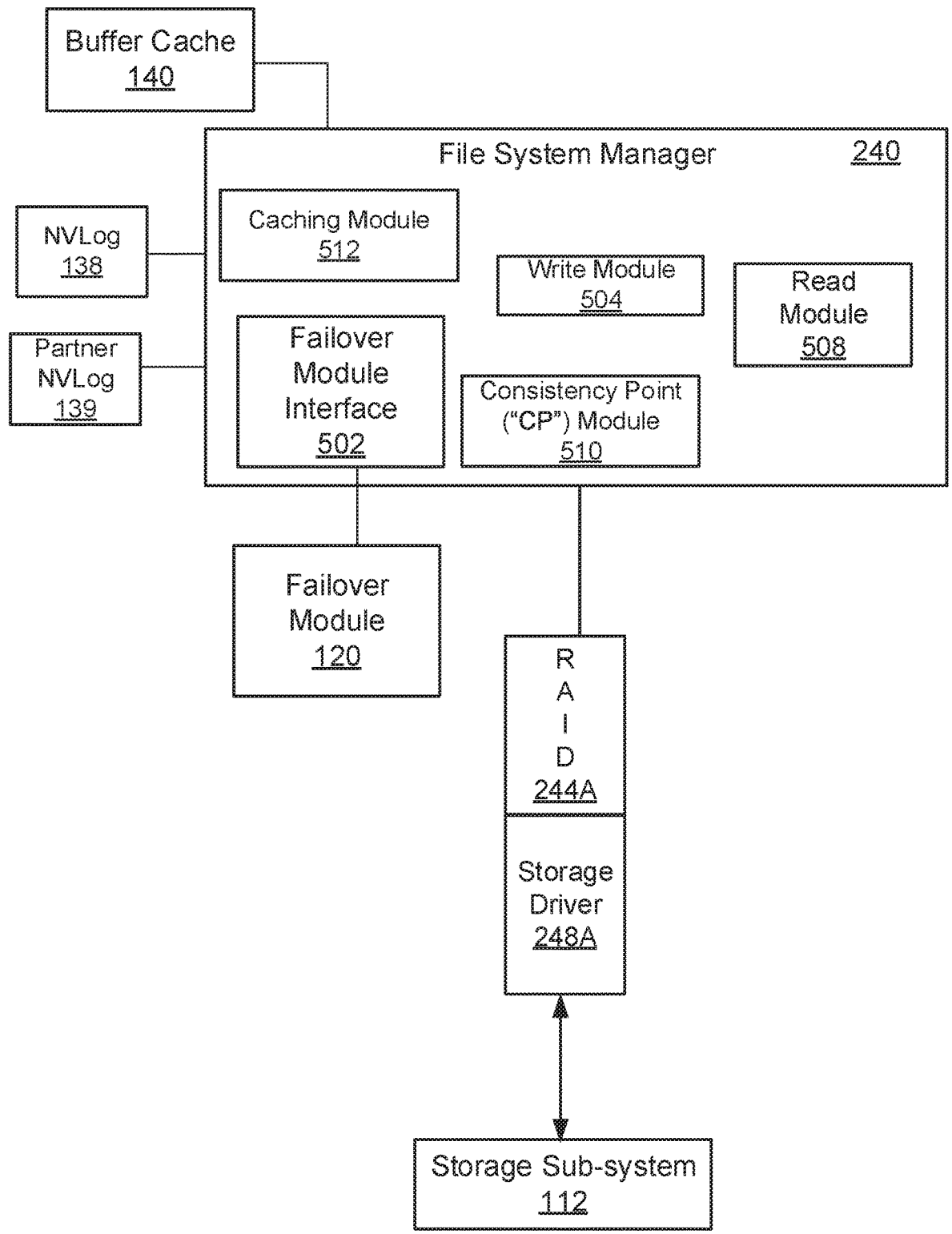
FIG. 5A shows a block diagram of a file system manager of a storage operating system according to aspects of the present disclosure.

File System Manager 240:

FIG. 5A shows a block diagram of the file system manager 240 (first introduced with respect to FIG. 2B), according to one aspect of the present disclosure. The file system manager 240 includes a write module 504 that manages write requests for writing data in storage device 118 (FIG. 1A) and a read module 508 that manages read requests for reading data from storage devices 118. The buffer cache 140 is managed by a caching module 512. A consistency point (CP) module 510 is used to manage CP operations to flush data from the buffer cache 140 to persistent storage (e.g. storage devices 118). In one aspect, when data is to be persistently stored, the data is marked as dirty at the buffer cache 140, and then the CP module 510 flushes the dirty data from the buffer cache 140 to the storage subsystem 112 e.g. at storage devices 118.

The read module 508 is used to fetch data from the storage devices 118 at the storage subsystem 112 in response to read requests. The RAID layer 244A using a storage driver 248A, for example a Fibre Channel driver, is used to access the storage devices 118 at the storage subsystem 112 to retrieve the requested data and present the data to an application that requested the data.

In one aspect, the file system manager 240 interfaces with the failover module 120 via a failover module interface (e.g. an API) 502 during a failover operation. The failover module 120 generates various data structures described below with respect to FIGS. 5B-5D that are used by the file system 240 to enable access to storage volumes transferred from a failed storage system node to the partner storage system node during partner NVLog replay that is executed to complete the failover operation.

Figure 5B:
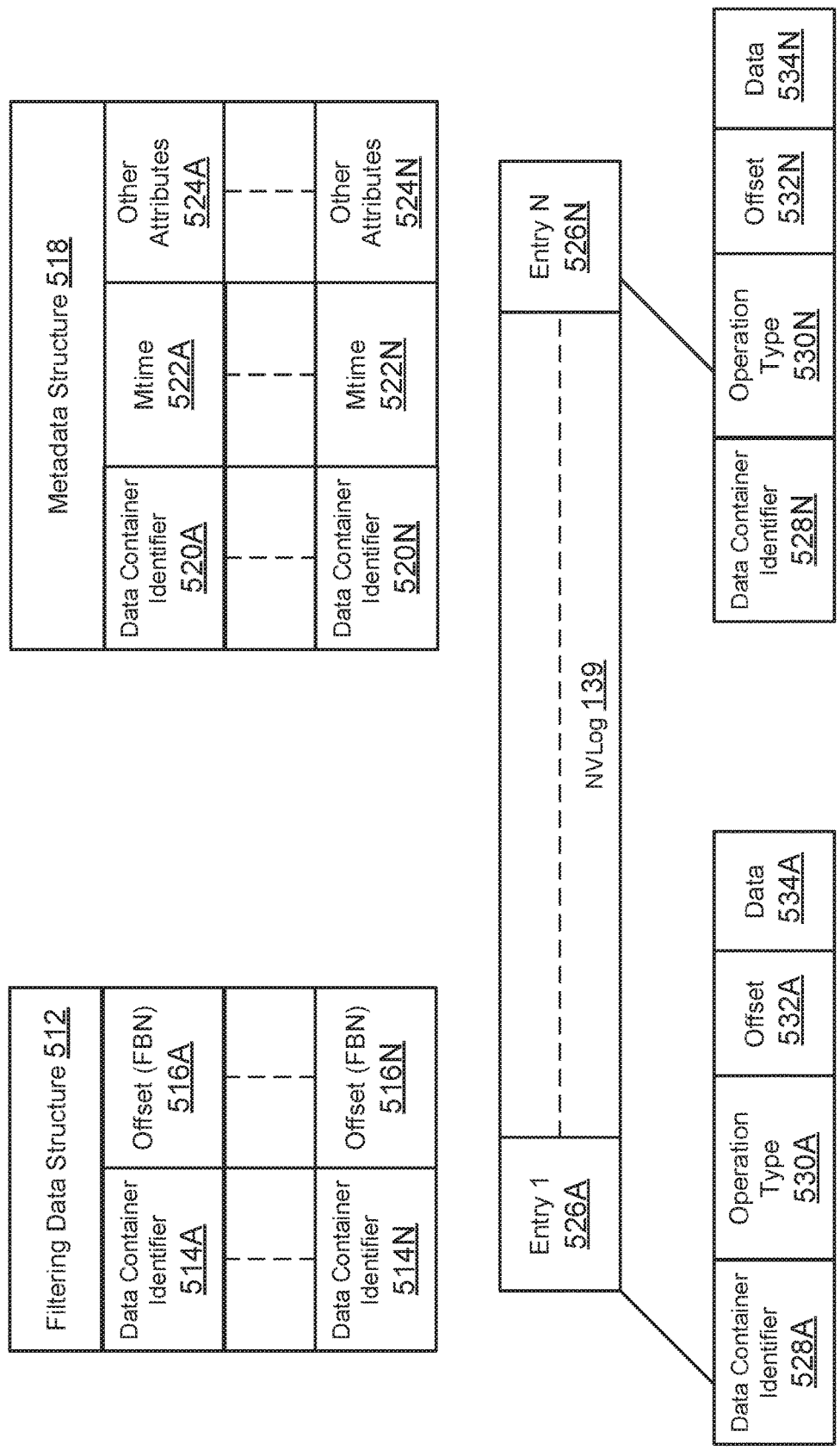
FIG. 5B shows an example of a filtering data structure, a non-volatile log (NVLog) and a metadata structure, used during a failover operation involving at least two storage system nodes, according to aspects of the present disclosure.

Partner NVLog 139, Filtering Data Structure 512, and Metadata Structure 518:

FIG. 5B shows an example of the partner NVLog 139 (e.g. 139A for storage system node 108A and 139B for storage system node 108B) having a plurality of entries 526A-526N (may also be referred to as "entry 526" or entries "526"). Each entry 526 identifies a data container by an identifier 528A/528N (e.g. a file handle that identifies an inode number) that is being processed at buffer cache 140 of the partner nodes 108A/108B. Each entry 526 indicates an operation type 530A/530N indicating whether an operation is a write operation an offset value (e.g. FBN) 532A/532N associated with the operation, and the data blocks 534A/534N associated with the write operations. As mentioned above, when a storage system node (e.g. 108A, FIG. 1B) receives a write request, the request is saved at the buffer cache (e.g. 140A), saved at the NVLog (e.g. 138A) of the storage system node 108A receiving the request and mirrored at the partner NVLog (e.g. 139B) of the partner storage system node (e.g. 108B).

If the storage system node 108A fails (as an example), then the partner storage system node 108B takes over the storage that was managed by storage system node 108A and replays (i.e. processes) the entries at the partner NVLog 139B during a failover operation. During an initial setup phase of the NVLog replay, a filtering data structure 512 and a metadata structure 518 are built using the partner NVLog 139B by the failover module 120B.

In one aspect, the filtering data structure 512 is implemented as a "bloom filter". A bloom filter is a space-efficient probabilistic data structure that is used to test whether an element is a member of a set. The filtering data structure 512 includes a unique data container identifier (e.g. a file handle) 514A/514N for each data container of a write request that is mirrored in the partner NVLog 139B and a corresponding file offset (e.g. FBN) 516A/516N associated with the data container identifier. The filtering data structure 512 is used to enable access to one or more storage volumes of a failed storage system node during NVLog replay, as described below in detail.

In another aspect, a metadata structure 518 is built to identify each data container using a unique identifier (e.g. a file handle) 520A/520N, and capture attributes associated with each data container, e.g., a timestamp indicating a time when a data container was modified (referred to as "mtime") 522A/522N and other attributes 524A/524N including data container size, time the data container was created or any other attribute. The metadata structure 518 is used to capture data container attributes during failover to enable access to one or more storage volumes of the failed storage system node during NVLog replay, as described below in detail.

Location Data Structure:

FIG. 5C shows a location data structure (may also be referred to as storage location cache (SLC)) 536 that is used to locate data stored in the partner NVLog 139B during NVLog replay as described below in detail. The location data structure 536 stores a data container identifier (e.g. a file handle) 540A/540N for each data container with a corresponding write request that is mirrored in the partner NVLog 139B, an offset value (e.g. FBN) 541A/541N associated with each data container identifier, and a corresponding data container location 542A/542N where data blocks associated with each data container is stored at the NVRAM 144B. The location data structure 536 is used for responding to read and write requests during partner NVLog replay, as described below in detail.

In one aspect, the location data structure 536 is updated during a failover operation of a failed storage system node, e.g. 108A. The partner NVLog 139B is traversed by the failover module 120B at the partner storage system node 108B, and any write operations in the partner NVLog 139B am captured in the location data structure 536. For data blocks that are logged multiple times in the partner NVLog 139B, only the latest data blocks are identified in the location data structure 536. This ensures that only the latest data is provided in response to a read request.

While the NVLog 139B is being replayed, any read request for a data container that has an entry at the NVLog 139B (e.g., for a location at the failed storage system 108A is processed by reading the data from the NVLog 139B, based on the offset value and the data location entry in the location data structure 536. Once the replay is complete, the entries associated with the NVLog 139B from the location data structure 536 are removed.

In one aspect entries inserted at the location data structure 536 are differentiated by any entry that is inserted by the file system manager 240 using a flag. This expedites removal of entries from the location data structure 536 after the NVLog replay. It is noteworthy that the location data structure 536 continues to have entries added by the file system manager 240 for storage volumes that are owned by the storage system node 108B during the partner NVLog 139B replay, and hence, are unaffected by the failover operation.

Figure 5D:
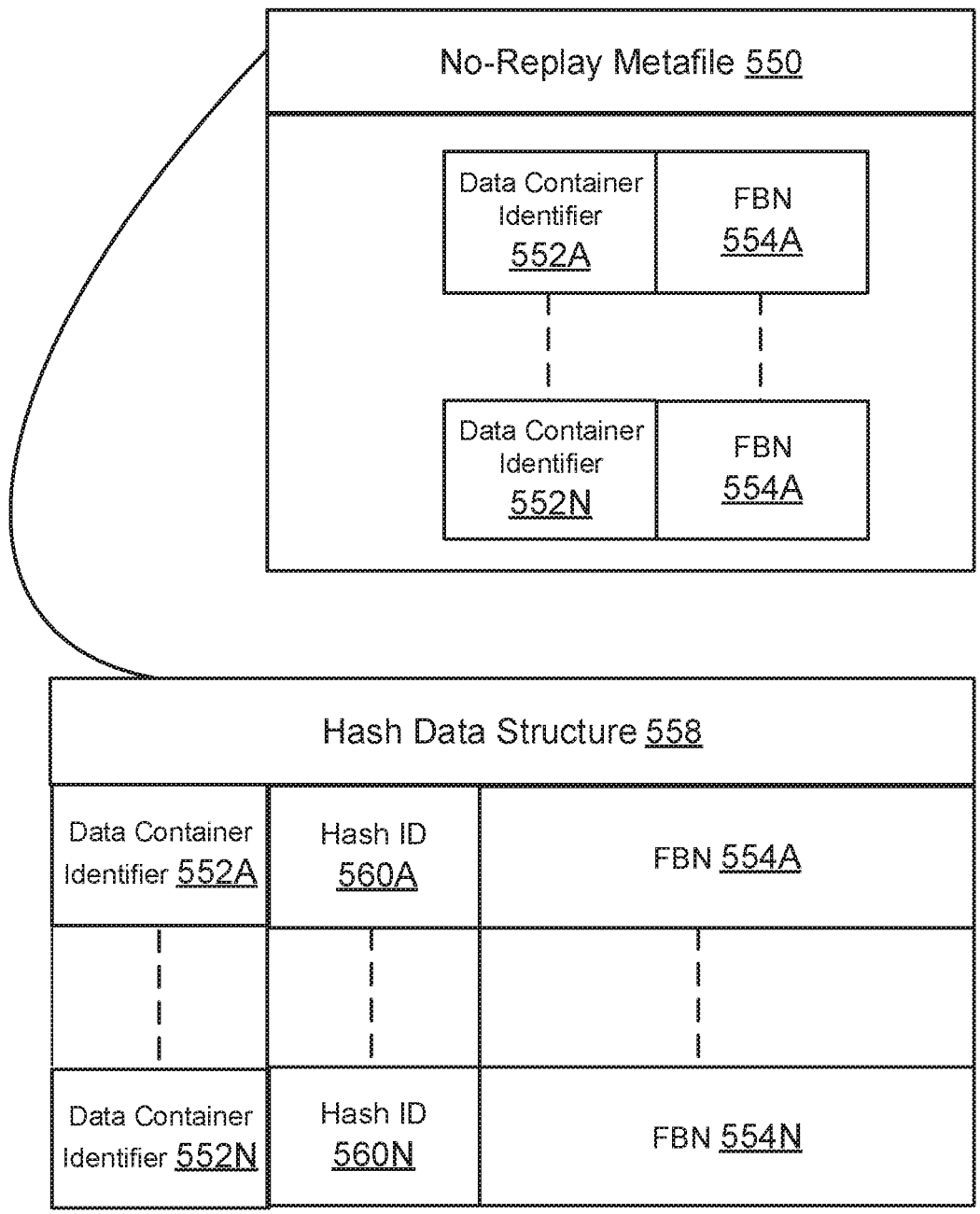
FIG. 5D shows an example of a no-replay metafile with an associated hash data structure used during a failover operation involving at least two storage system nodes, according to aspects of the present disclosure.

No-replay Metafile and Hash Data Structure:

FIG. 5D shows a "no-replay" metafile 550 (may be referred to as the "metafile 550") and a corresponding hash data structure 558 according to one aspect of the present disclosure. The metafile 550 is created during the initial setup phase of a partner NVLog replay operation. The metafile 550 is intended to persistently store all write requests without the actual write data that are allowed during the replay operation as described below with respect to FIG. 6F.

As an example, the metafile 550 includes a data container identifier (e.g. a file handle) 552A/552N and a corresponding an offset value (e.g. FBN 554A/554N). The metafile 550 is stored at persistent storage (e.g. initially at NVRAM 144 and then at the storage device 118 after a CP operation). The hash data structure 558 is stored at a memory of the storage system node 108B during replay, and includes a hash identifier 560A/560N that is based on the data container identifier 552A/552N with the corresponding FBN 554A/554N. The use of the metafile 550 and the hash data structure 558 is described below with respect to FIGS. 6F-6G.

Figure 6A:
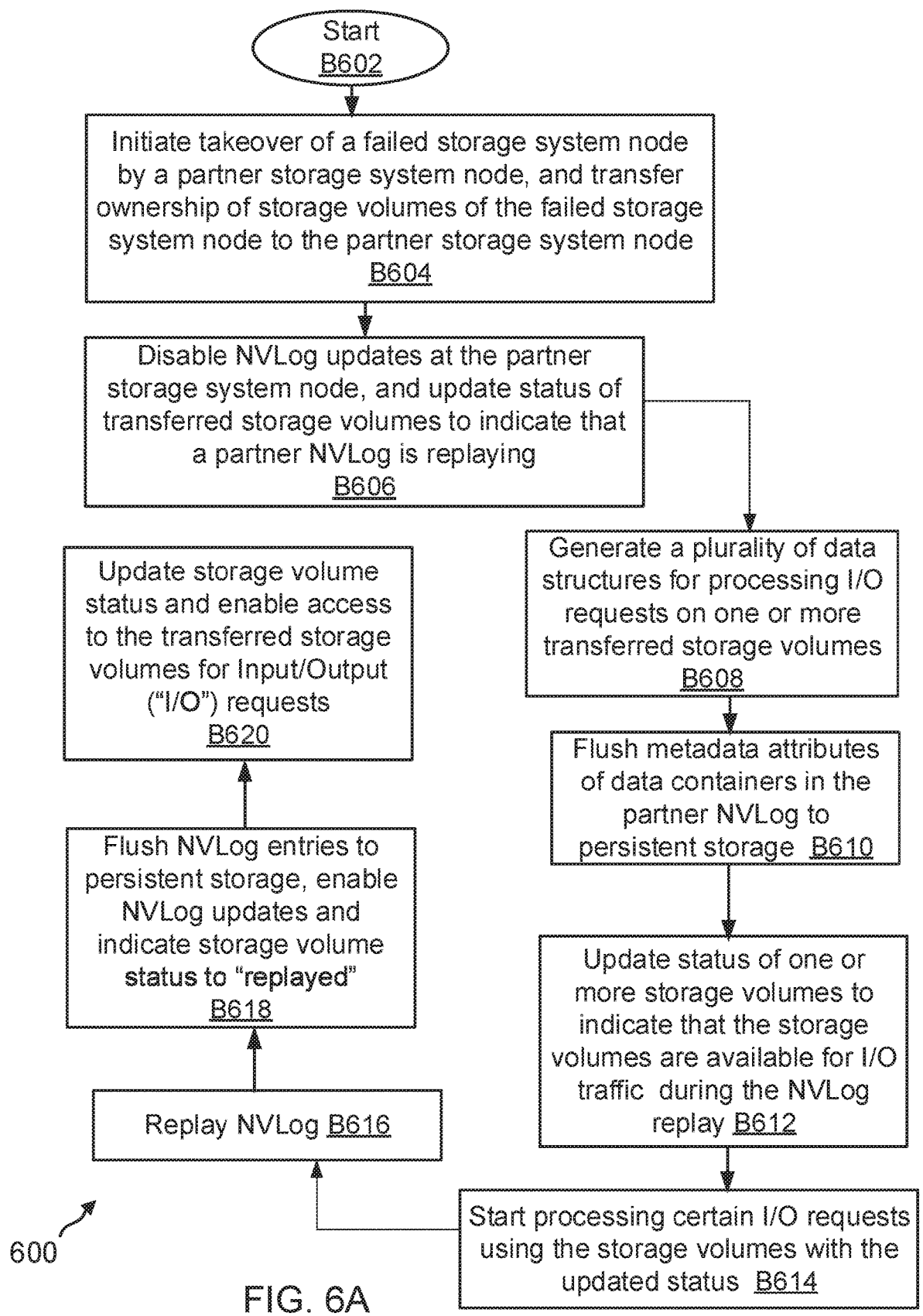
FIG. 6A shows a process for generating a plurality of data structures for enabling access to storage of a failed storage system node during a failover operation, according to aspects of the present disclosure.

Process Flows: FIG. 6A shows a process flow 600 for enabling access to one or more storage volumes of a failed storage system node, during a partner NVLog replay at a partner storage system node that takes over the storage of the failed node, according to one aspect of the present disclosure. The examples described below refer to take over of storage volumes, but the adaptive aspects of the present disclosure are applicable to any other physical or logical representation of storage.

Process 600 begins in block B602, when a storage system node (e.g. storage system node 108A, FIG. 1B) fails or is non-responsive.

In block B604, a failover (or takeover) operation is initiated by the partner storage system node (e.g. 108B) to take over one or more storage volumes that was managed/owned by the failed storage system node 108A, prior to the failure. The term managed or owned means that prior to the failure, the storage system node 108A processed the read and write requests associated with the storage volumes presented by the storage system node 108A. The storage volumes of storage system node 108A are also referred to as partner storage volumes from storage system node 108B's perspective. The failover operation is initiated by the failover module 120B. The ownership of the partner storage volumes is transferred to the partner storage system node 108B. Thereafter, the state of the partner storage volumes is updated (e.g. to a state referred to as "mounting") to indicate that the failover operation is in progress. As an example, the storage volume state is updated in a volinfo block of each transferred storage volume.

In block B606, any new updates to the partner NVLog 139B at the partner storage system node 108B are disabled. Thereafter, the state of the partner storage volumes is updated to indicate that the transferred storage volumes are "Replaying."

In block B608, the failover module 120 scans the partner NVLog 139B to build the filtering data structure 512 and the metadata data structure 518 for the entries mirrored in the partner NVLog 139B associated with one or more transferred storage volumes. The location data structure 536 is also updated to identify storage locations at the NVRAM 144B for any data associated with data containers identified by the partner NVLog 139B.

In block B610, the attributes in the metadata structure 518 (e.g. mtime 522/other attributes 524) for the data containers identified by the partner NVLog 139B are flushed to persistence storage (e.g. to NVRAM 144B or to storage 118). Details of using the flushed metadata attributes are provided below with respect to FIG. 6H. Thereafter, in block B612, the state of the one or more transferred storage volumes is updated to "special mounting". This status indicates to the file system 240 that the one or more storage volumes can now respond to incoming I/O requests from host 102 and client systems 116 to read and/or write data. The special mounting status also indicates to the file system 240 that the read and write requests are to be processed using the filtering data structure 512, metadata structure 518 and the location data structure 536.

In block B614 as described below in detail with respect to FIGS. 6D/6E, new read and write requests can be processed while the partner NVLog 139B is being replayed by the file system 240 in block B616.

In block B618 operations associated with the entries of the partner NVLog 139B are executed (e.g. the partner NVLog 139B mirrored write requests are processed). Data blocks associated with the NVLog 139B are flushed to the storage subsystem 112B (FIG. 1B) by the CP module 510 (FIG. 5A). Thus, the data in the partner NVLog 139B is persistently stored, and operations that were not completely executed by the storage system node 108A, prior to the failure, are completed. Thereafter, in block B620, the status of the one or more replayed storage volumes is changed to "Full Mounted", indicating to the file system 240 that the transferred storage volumes are ready for regular I/O operations through the partner storage system node 108B. After the NVLog replay is completed, any entry at the location data structure 536 associated with the NVLog replay is removed.

Figure 6B:
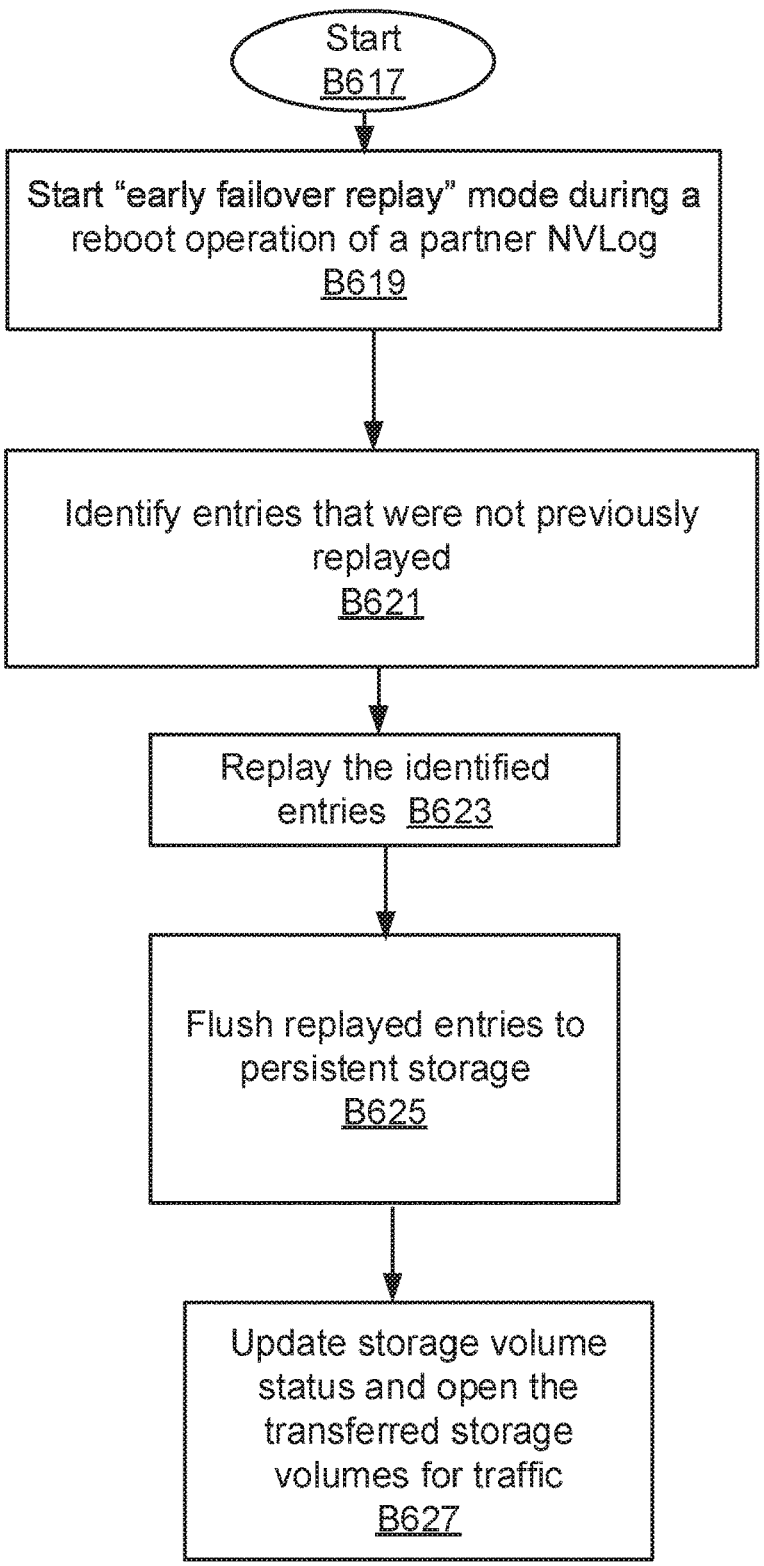
FIG. 6B shows a process for handling a crash during the failover operation of FIG. 6A, according to aspects of the present disclosure.

FIG. 6B shows a process 615 that is executed if there is a crash during the partner NVLog replay described above with respect to FIG. 6A. Process 615 begins in block B617. Continuing with the example of FIG. 6A assume that the partner NVLog 139B at the storage system node 108B was being replayed and crashed before the failover operation was completed. The partner storage system node 108B is rebooted in block B619. An "early failover replay" mode is initiated for the partner NVLog 139B. During the early failover replay mode, the entries that were not previously replayed in the process of FIG. 6A, are identified in block B621. In one aspect, the entries can be determined by examining an fsinfo block of each data container that identifies a last sequence number of a previously executed consistency point operation. The last sequence number identifies the last operation that was executed during the last consistency point, prior to the crash during replay. The identified entries are entries starting from a next consecutive entry from the last recorded entry in the partner NVLog that was replayed, prior to the crash. The identified entries are replayed by the file system 240 in block B623 and then flushed to persistent storage in block B625. The status of the one or more transferred storage volumes is then updated in block B627, to indicate that the transferred storage volumes are available for client I/O traffic.

Figure 6C:
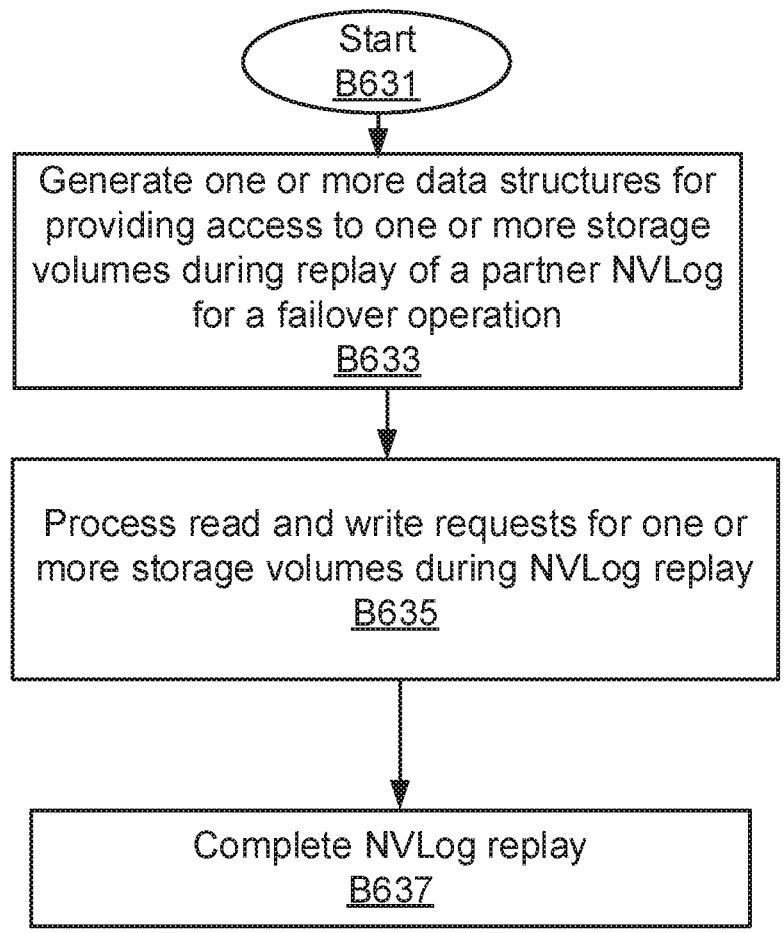
FIG. 6C shows another process for enabling access to storage of a failed storage system node during the failover operation of FIG. 6A, according to aspects of the present disclosure.
Figure 6C:

FIG. 6C shows a process 629 according to one aspect of the present disclosure. Process 629 begins after ownership of one or more storage volumes of the failed storage system node 108A has been transferred to the partner storage system node 108B during a failover operation. Before the partner NVLog 139B is replayed, in block B633, the failover module 120 generates data structures 512 and 518, no-replay file 550/hash data structure 558 and updates location data structure 536. Thereafter, in block B635, read and/or write requests to one or more storage volumes of the failed nodes are processed. The process for handling read and write requests are described below with respect to FIGS. 6D-6G. The partner NVLog replay is completed in block B637 and the one or more storage volumes are made available without any restrictions.

In one aspect, a method is provided. The method includes generating (e.g. B608, FIG. 6A and B633, FIG. 6C) by a processor (e.g. processor 702A or 702B, FIG. 7) of a second storage node (e.g. 108B, FIG. 1B), a filtering data structure (e.g. 512, FIG. 5B) and a metadata data structure (e.g. 518, FIG. 5B) before starting a replay of entries (e.g. 526A-526N, FIG. 5B) of a log (e.g. 139B, FIG. 1B) stored at a non-volatile memory (e.g. 144B, FIG. 1B) of the second storage node for a failover operation initiated in response to a failure at a first storage node, the second storage node operating as a partner node of the first storage node to mirror at the non-volatile memory, one or more write requests and data associated with the one or more write requests received by the first storage node prior to the failure. The filtering data structure identifies the entries, and the metadata structure stores a metadata attribute of data containers associated with the entries.

The method further includes updating (e.g. B608, FIG. 6A) by the processor, before the replay, a location data structure (e.g. 536, FIG. 5C) indicating storage locations of the non-volatile memory that store the data associated with the write requests received by the first storage node prior to the failure and mirrored at the non-volatile memory; and utilizing by the processor, the filtering data structure, the metadata structure and the location data structure for providing access to a logical storage object for processing (e.g. B614, FIG. 6A and B635, FIG. 6C) an input/output ("I/O") request received during the replay of the entries by the second storage node.

In yet another aspect, a non-transitory machine readable medium having stored thereon instructions with machine executable code is provided. When executed, the executable code causes the machine (e.g. the storage system node 108B after the storage system node 108A has failed) to: generate a filtering data structure and a metadata data structure, before starting a replay of entries of a log stored at a non-volatile memory of a second storage node for a failover operation initiated in response to a failure at a first storage node, the second storage node operating as a partner node of the first storage node to mirror at the non-volatile memory, one or more write requests and data associated with the one or more write requests received by the first storage node prior to the failure. The filtering data structure identifies the entries, and the metadata structure stores a metadata attribute of data containers associated with the entries.

The executable code further causes the machine to: utilize the filtering data structure and the metadata structure for providing access to a logical storage object for processing an input/output ("I/O") request received during the replay of the entries by the second storage node.

In yet another aspect, a system with a memory (e.g. 704, FIG. 7) containing machine readable medium with machine executable code is provided. A processor (e.g. 702A or 702B, FIG. 7) coupled to the memory executes the machine executable code to: generate a filtering data structure and a metadata data structure, before starting a replay of entries of a log stored at a non-volatile memory of a second storage node for a failover operation initiated in response to a failure at a first storage node, the second storage node operates as a partner node of the first storage node to mirror at the non-volatile memory, one or more write requests and data associated with the one or more write requests received by the first storage node prior to the failure. The filtering data structure identifies the entries, and the metadata structure stores a metadata attribute of data containers associated with the entries. The processor utilizes the filtering data structure and the metadata structure for providing access to a logical storage object for processing an input/output ("I/O") request received during the replay of the entries by the second storage node.

As shown above, the process flows of FIGS. 6A-6C provide technical solutions that are deeply rooted in computing technology for enabling access to partner volumes during partner NVLog replay. This allows client computing devices to store and retrieve data with less disruption during a failover operation because outage time for accessing the failed storage due to a failover operation is reduced. In conventional systems, transferred partner volumes after a failure are inaccessible during NVLog replay, which is undesirable.

Figure 6D:
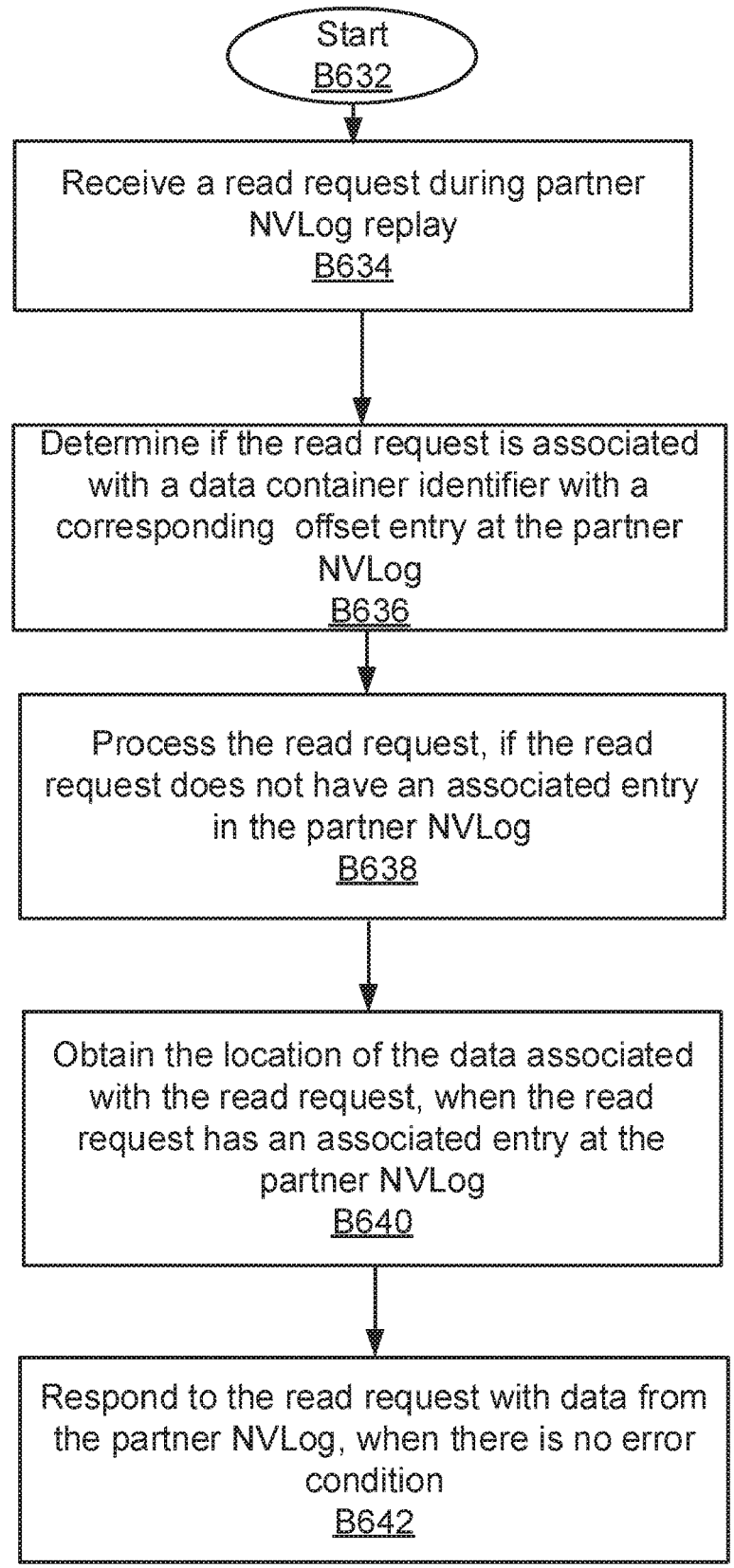
FIG. 6D shows a process flow for processing read requests for storage of a failed storage system node during the failover operation of FIG. 6A, according to aspects of the present disclosure.

FIG. 6D shows a process 630 for handling read requests for one or more storage volumes with the "special mounted" status as described above with respect to block B612 of FIG. 6A. The one or more storage volumes are made available for read requests during partner NVLog replay.

Process 630 begins in block B632, when the file system manager 240 is made aware of the "special mounted" status by the failover module 120. The file system manager 240 can be made aware by a message from the failover module 120. The filtering data structure 512, the metadata structure 518 are built and location data structure 536 is updated as described above with respect to FIG. 6A.

A read request is received in block B634. The request may be from a host system 102, client 116 or any other entity. The read request identifies a data container (e.g. by a file handle) and an associated offset value (e.g. FBN) for the requested data.

In block B636, the failover module 120 uses the data structure 512 to determine if an entry associated with the data container identifier and a corresponding FBN in the received read request is located at the partner NVLog 139B. If there is no entry, then in block B638, the read module 508 of file system manager 240 processes the read request as if the storage volume associated with the read request is operating normally (e.g., the read request is processed using the buffer cache 140 when the requested data is located at the buffer cache 140, or retrieved from any other storage location).

If the read request has an associated entry in the partner NVLog 139B, then in block B640, the read module 508 uses the location data structure 536 to determine the location of the data associated with the read request at the partner NVLog 139B.

In block B642, the read module 508 responds to the read request if there is no error condition. An example of an error condition would be if there is an error associated with accessing the entry at the location data structure 536. It is noteworthy that if a new write request associated with the entry in the partner NVLog 139B is received during the partner NVLog 139B replay, the new write request maybe suspended.

Figure 6E:
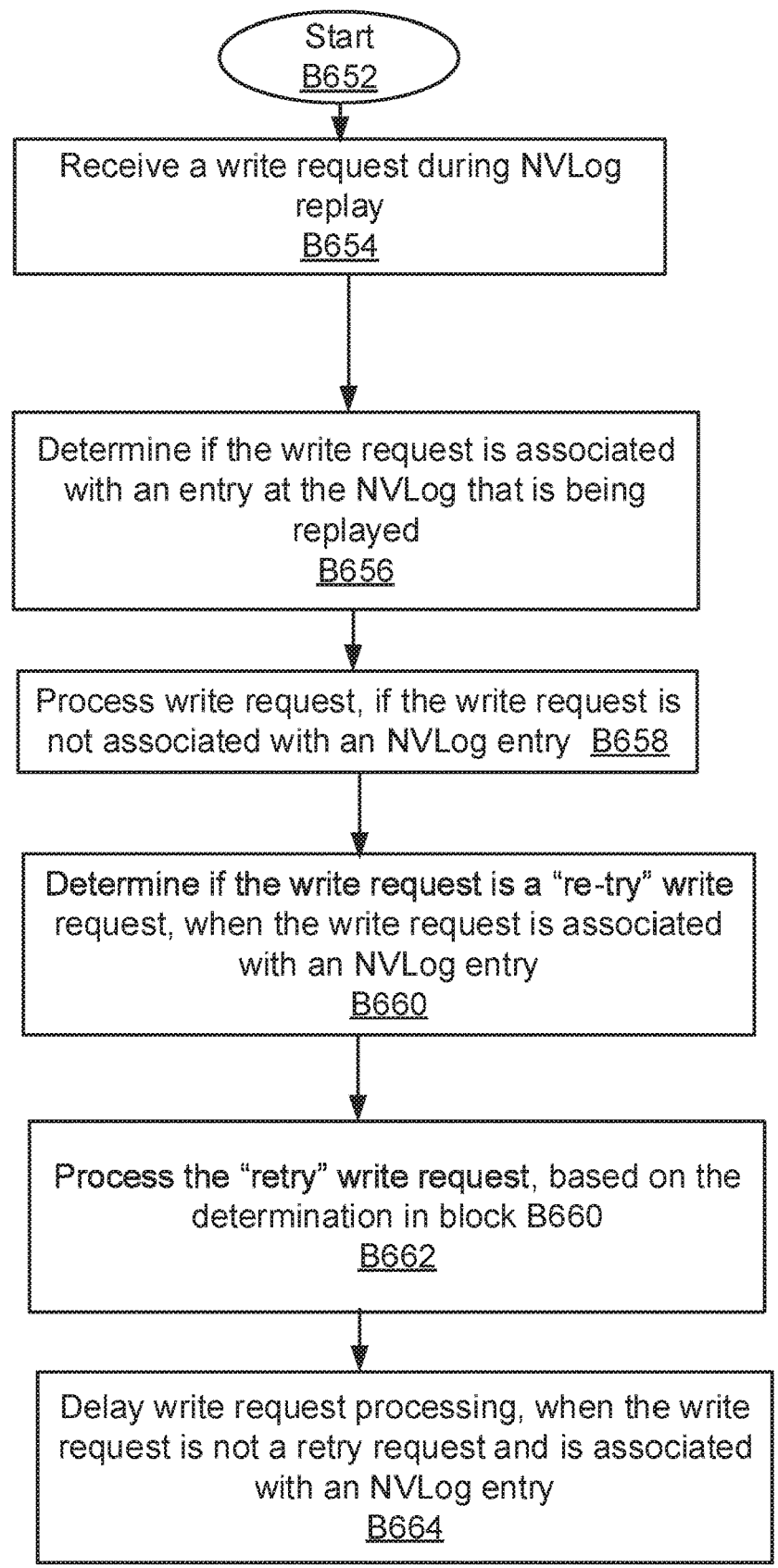
FIG. 6E shows a process flow for processing re-try write requests directed towards storage of a failed storage system node during the failover operation of FIG. 6A according to aspects of the present disclosure.

FIG. 6E shows a process 650 for handling write requests for one or more storage volumes with the "special mounted" status of FIG. 6A. The process begins in block B652, after data structures 512, and 518 of FIG. 5B, and data structure 536 of FIG. 5C have been generated as part of a setup phase for the partner NVLog replay, described above with respect to FIG. 6A.

In block B654, a write request is received to write data. The request specifies a data container identifier and an offset value (e.g. FBN).

In block B656, the failover module 120 checks the data structure 512 to determine if an entry for the data container and the associated FBN exists in the partner NVLog 139B. If an entry does not exist then the write request is processed by the file system 240 in block B658.

If there is an entry with an associated FBN, then in block B660, the failover module 120 compares the data for the write request with the data associated with the entry for the same FBN in the partner NVLog 139B. The location data structure 536 is used to locate the data in the partner NVLog 139B for the comparison. The comparison is performed to determine if the write request in block B654 is a "re-try" write request i.e. the same write request was sent to the failed storage system node, prior to the failure, and no new write request for the same FBN was received after the failure. This ensures that the write request is the last write request for the FBN, prior to the failure of the storage node 108B.

If the data for the write request and the data at the partner NVLog 139B is the same, then in block B662, the write request is processed (e.g., the data in the received write request is written to storage by the write module 504 of the file system manager 240). The metadata (e.g. mtime 522 and other attributes 524) associated with the data container that is written, as indicated in the metadata structure 518 is updated to reflect the rewrite operation. If the data is different, then the system determines that the write request is an "over-write" request to overwrite data for a previous write request that has not been processed. The write request is then delayed in block B664, until the NVLog replay process is completed as described above with respect to FIG. 6A.

In one aspect of the present disclosure, a method is provided. The method includes receiving (e.g. B634, FIG. 6D) by a processor (e.g. 702A or 702B, FIG. 7) of a second storage node (e.g. 108B, FIG. 1B), a read request associated with a first storage object during a replay of entries (e.g. 526A/526N, FIG. 5B) of a log (e.g. 139B, FIG. 1B) stored in a non-volatile memory (e.g. 144B, FIG. 1B) of the second storage node for a failover operation, initiated in response to a failure at a first storage node responsible for managing the first storage object before the failure. The second storage node operates as a partner node of the first storage node to mirror at the non-volatile memory one or more write requests associated with the first storage object and data associated with the one or more write requests received by the first storage node prior to the failure.

The method further includes determining (e.g. B636, FIG. 6D) by the processor, whether the read request has an associated entry at a filtering data structure (e.g. 512, FIG. 5B) that is generated from the log, prior to the replay and identifies the entries in the log; processing (e.g. B638, FIG. 6D) the read request by the processor, when the filtering data structure does not include an entry associated with the read request; and utilizing a location data structure (e.g. 536, FIG. 5C) by the processor, to locate data associated with the read request at the non-volatile memory and providing (e.g. B642, FIG. 6D) the located data in response to the read request, when the filtering data structure includes an entry associated with the read request.

In yet another aspect, another method is provided. The method includes receiving (e.g. B654, FIG. 6E) by a processor (e.g. 702A or 702B, FIG. 7) of a second storage node (e.g. 108B, FIG. 1B), a write request associated with a first storage object during a replay of entries (e.g. 526A/526N, FIG. 5B) of a log (e.g. 139B, FIG. 1B) stored in a non-volatile memory (e.g. 144B, FIG. 1B) of the second storage node for a failover operation, initiated in response to a failure at a first storage node responsible for managing the first storage object before the failure. The second storage node operates as a partner node of the first storage node to mirror at the non-volatile memory one or more write requests associated with the first storage object and data associated with the one or more write requests received by the first storage node prior to the failure.

The method further includes determining (B656, FIG. 6E) by the processor, whether the write request has an entry in a filtering data structure (e.g. 512, FIG. 5B) that identifies each log entry and is generated using the log, prior to the replay; processing (e.g. B658, FIG. 6E) the write request by the processor, when the write request is not associated with any filtering data structure entry; determining (e.g. B660, FIG. 6E) by the processor that the write request is a re-try write request, when the write request is associated with a filtering data structure entry; and executing (e.g. B662, FIG. 6E) the re-try write request by the processor from the second storage node, during the replay at the second storage node.

In yet another aspect, a non-transitory machine readable medium having stored thereon instructions with machine executable code is provided. When executed, the executable code causes the machine (e.g. the storage system node 108B after the storage system node 108A has failed) to: receive a read request associated with a first storage object, during a replay of entries of a log stored in a non-volatile memory of a second storage node for a failover operation, initiated in response to a failure at a first storage node responsible for managing the first storage object before the failure. The second storage node operates as a partner node of the first storage node to mirror at the non-volatile memory one or more write requests associated with the first storage object and data associated with the one or more write requests received by the first storage node prior to the failure.

The executable code further causes the machine to: determine whether the read request has an associated entry at a filtering data structure that is generated from the log to identify each log entry, prior to the replay; process the read request, when the filtering data structure does not include an entry associated with the read request; and utilize a location data structure to locate data associated with the read request at the non-volatile memory and provide the located data in response to the read request, when the filtering data structure includes an entry associated with the read request.

Figure 6F:
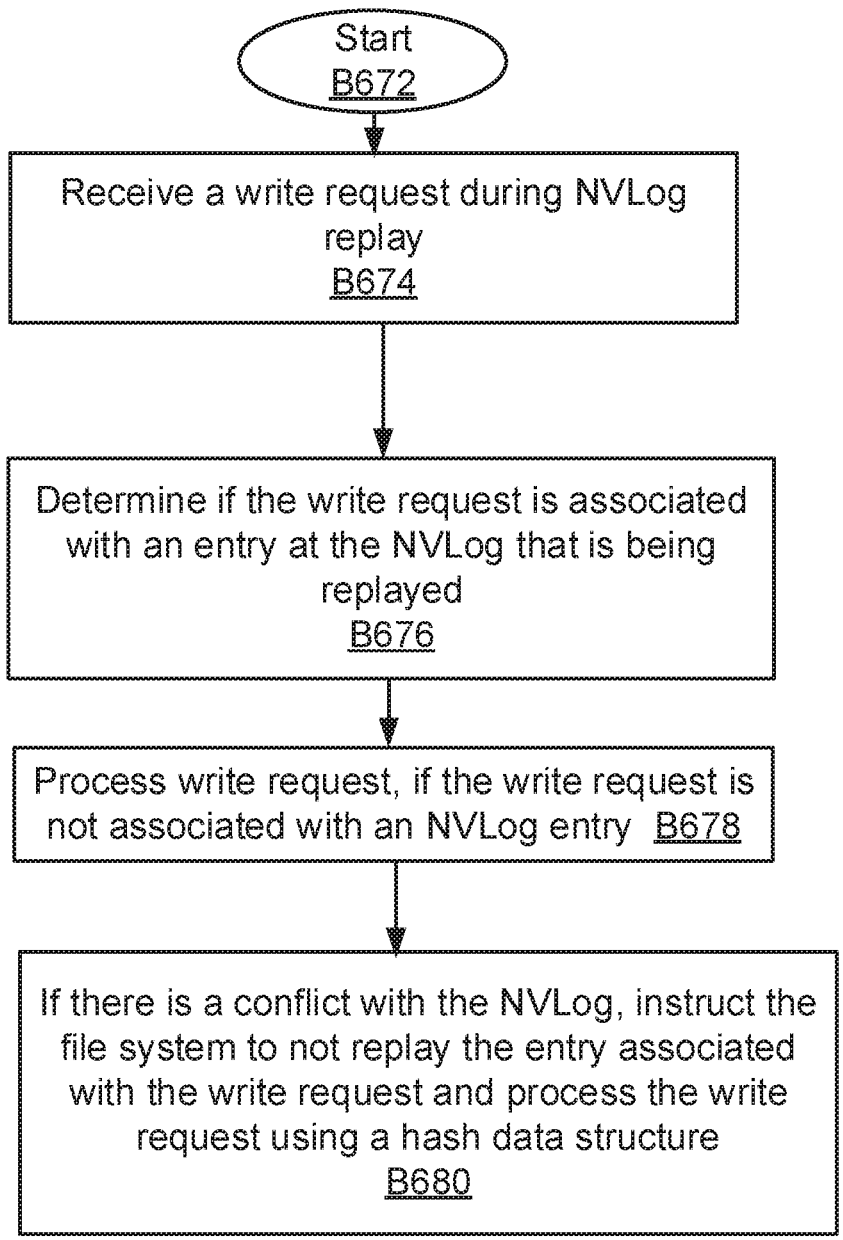
FIG. 6F shows a process flow for processing write requests using the data structure of FIG. 5D, according to aspects of the present disclosure.

FIG. 6F shows another process 670 for managing overwrite requests during partner NVLog replay, according to one aspect of the present disclosure. Process 670 begins in block B672, when the filtering data structure 512 for a failover operation has been generated. The metafile 550 with the associated hash data structure 558 is also initialized prior to the partner NVLog 139B replay. The metafile 550 is stored at persistent storage. e.g. first stored at NVRAM 144B and then later flushed to storage 118 during a CP operation. The hash data structure 558 is stored at a memory of the partner storage system node 108B.

In block B674, a write request is received to write data for a data container during the partner NVLog replay. The request identifies the data container with a corresponding FBN. In block B676, the failover module 120 determines if the data container with the corresponding FBN identified in the write request has a corresponding entry at the filter data structure 512. If there is no entry, then in block B678, the write request is processed by the write module 504, and the data is written to persistent storage, for example, first at NVRAM 144 and then later flushed to storage 118 during a CP operation.

If there is an associated entry, then in block B680, an entry for the write request (e.g. a hash value derived from the data container identifier and the FBNs of the write request) is added to the hash data structure 558 and the metafile data structure 550. The metafile data structure 550 may be stored at the NVRAM 144B using NVLog 138B and later flushed to storage (118, FIG. 1B) during a CP operation. A message (e.g., the received write request) is sent to the file system 240 indicating that an entry associated with any pending write request at the partner NVLog 139A with the same data container identifier and the FBN of the received write request of block B674 not be replayed. This indicates to the file system manager 240 that the write request of block B674 is to be handled like a regular write request. When the file system 240 is processing the partner NVLog 139B entries, the file system manager 240 checks the hash data structure 558 and skips the entries that are included in the hash data structure 558. If the system crashes during replay, then during a recovery operation, the metafile data structure 550 is read to rebuild the hash data structure 558. After a successful replay, the metafile data structure 550 is deleted or invalidated.

It is noteworthy that the hash data structure 558 is also used for providing the latest data for a read request with an associated entry at the partner NVLog 139B, as described below with respect to FIG. 6G.

Figure 6G:
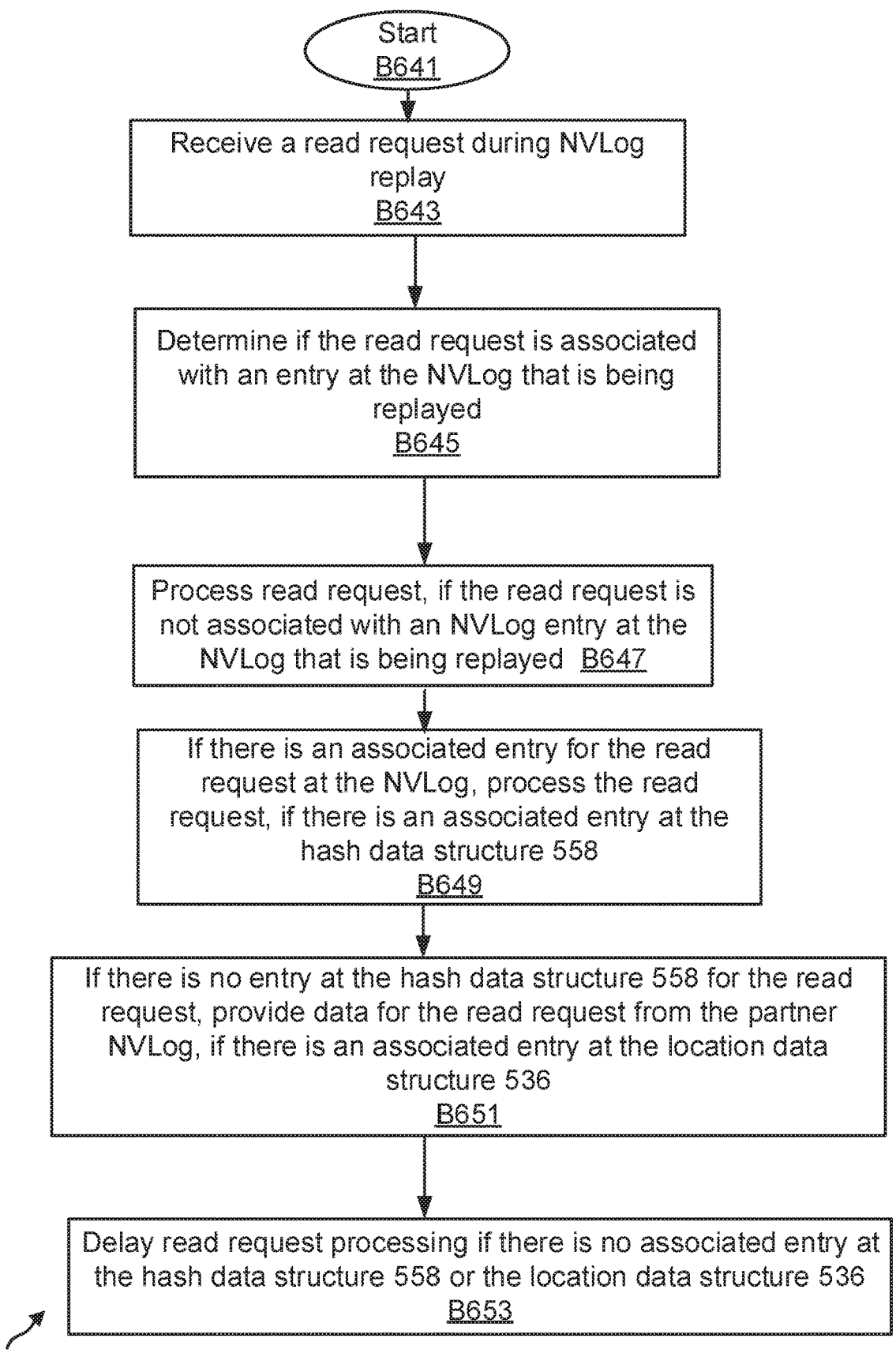
FIG. 6G shows another process flow for processing read requests using the data structure of FIG. 5D, according to aspects of the present disclosure.

FIG. 6G shows another process 639 for managing read requests using both the location data structure 536 and the hash data structure 558, during partner NVLog replay, according to one aspect of the present disclosure. Process 639 begins in block B641, when the filtering data structure 512 for a failover operation has been generated and the metafile 550 with the associated hash data structure 558 has been initialized. The metafile 550 is stored at persistent storage, e.g. first stored at NVRAM 144B and then later flushed to storage 118 during a CP operation. As mentioned above, the hash data structure 558 is stored at a memory of the partner storage system node 108B.

In block B643, a read request is received, during the partner NVLog replay. The request identifies a data container with a corresponding FBN.

In block B645, the failover module 120 determines if the data container with the corresponding FBN identified in the read request has a corresponding entry at the filter data structure 512. If there is no entry, then in block B647, the read request is processed by the read module 508 by retrieving the requested data either from the buffer cache 140 or persistent storage (e.g. NVRAM 144B and/or storage 118).

If there is an associated entry, then in block B649, the failover module 120 determines if the hash data structure 558 includes an entry for the data container identifier and the associated FBN of the read request. If there is an entry at the hash data structure 558, then the read module 508 processes the read request like a regular read request. If there is no entry at the hash data structure 558, then in block B651, the process checks the location data structure 536 to determine if there is an entry corresponding to the data container identifier and the associated FBN. If there is an entry, then the requested data is retrieved from the partner NVLOG 139B to process the read request.

If there is no entry at either the hash data structure 558 or the location data structure 536, the read request processing is delayed in block B653, until the NVLog replay is complete.

The process flows of FIGS. 6D-6G provide innovative technology that enable computing systems to read and write data during an NVLog replay operation. The disclosed solutions are rooted in computing technology since they enable a computing device to use storage devices for storing and retrieving data while a failover operation is in progress. This limits disruption and improves usage of computing and storage resources.

Figure 6H:
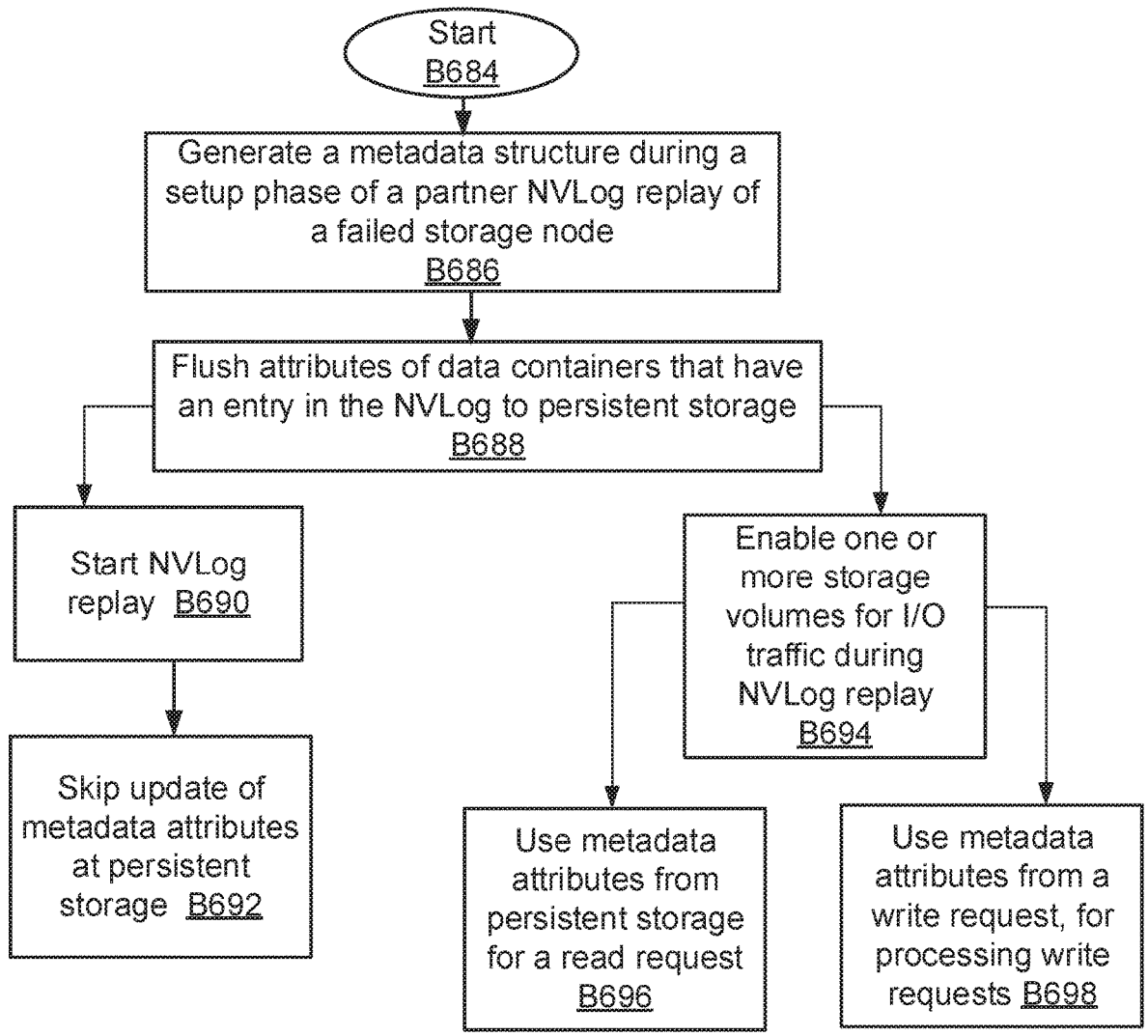
FIG. 6H shows a process flow for managing metadata attributes during the failover operation of FIG. 6A, according to aspects of the present disclosure.

FIG. 6H shows a process 682 for managing data container attributes, e.g. a modification time, file size, or any other attribute, during partner NVLog replay, and when storage volumes of the failed node are made available for client I/O traffic. The process begins in block B684, when a storage system node (e.g. 108A) has failed and the storage volumes of the storage system node 108A have been taken over by a partner storage system node (e.g. 108B). Prior to starting the replay of the partner NVLog 139B, the metadata structure 518 (FIG. 5B) is built as described above with respect to FIG. 6A.

In block B688, the data container attributes (e.g. 522/524) are flushed to persistent storage, e.g. first to NVRAM 144B and then later to storage 118 during a CP operation.

Thereafter, the partner NVLog 139B replay begins in block B690. In block B692, the metadata attributes that have been persistently stored are skipped during replay. At the same time, while the NVLog is being replayed, one or more storage volumes of the failed storage system node 108A are made available for I/O traffic in block B694. For any read request, in block B696, metadata attributes (e.g. for mtime) from persistent storage are provided. For a write request, the attributes included in the write request are extracted and used for processing the write request in block B698.

In one aspect of the present disclosure, a method is provided. The method includes generating (e.g. B686, FIG. 6H) by a processor (e.g. 702A or 702B of FIG. 7) of a second storage node (e.g. 108B, FIG. 1B), a metadata data structure (e.g. 518, FIG. 5B) before starting a replay of entries (e.g. 526A/526N, FIG. 5B) of a log (e.g. 139B, FIG. 1B) stored in a non-volatile memory (e.g. 144B, FIG. 1B) of the second storage node for a failover operation initiated in response to a failure at a first storage node (e.g. 108A, FIG. 1B), the second storage node operating as a partner node of the first storage node to mirror at the non-volatile memory, one or more write requests and data associated with the one or more write requests received by the first storage node prior to the failure. The metadata structure stores a metadata attribute (e.g. 522A/522N, FIG. 5B) of each data container (e.g. 520A/520N. FIG. 5B) associated with each log entry.

The method further includes persistently storing (e.g. B688, FIG. 6H) by the processor, prior to the replay, the metadata attribute from the metadata structure; utilizing by the processor, the persistently stored metadata attribute to respond to a read request received during the replay by the second storage node (e.g. B696, FIG. 6H); extracting by the processor, a write request metadata attribute from a write request received by the second storage node during the replay (B698, FIG. 6H); and utilizing by the processor, the extracted metadata attribute for executing the write request (B698, FIG. 6H).

In another aspect, a non-transitory machine readable medium having stored thereon instructions with machine executable code is provided. When executed, the executable code causes the machine (e.g. the storage system node 108B after the storage system node 108A has failed) to: generate a metadata data structure before starting a replay of entries of a log stored in a non-volatile memory of a second storage node for a failover operation, initiated in response to a failure at a first storage node, the second storage node operating as a partner node of the first storage node to mirror at the non-volatile memory, one or more write requests and data associated with the one or more write requests received by the first storage node prior to the failure. The metadata structure stores a metadata attribute of each data container associated with each log entry.

The executable code further causes the machine to: persistently store, prior to the replay, the metadata attribute from the metadata structure: utilize the persistently stored metadata attribute to respond to a read request received during the replay by the second storage node; and utilize a write request metadata attribute for executing a write request received during the replay by the second storage node.

In yet another aspect, a system with a memory (e.g. 704, FIG. 7) containing machine readable medium with machine executable code is provided. A processor (e.g. 702A or 702B, FIG. 7) coupled to the memory executes the machine executable code to: generate a metadata data structure before starting a replay of entries of a log stored in a non-volatile memory of a second storage node for a failover operation, initiated in response to a failure at a first storage node, the second storage node operating as a partner node of the first storage node to mirror at the non-volatile memory, one or more write requests and data associated with the one or more write requests received by the first storage node prior to the failure. The metadata structure stores a metadata attribute of each data container associated with each log entry.

The processor further executes the machine executable code to: persistently store, prior to the replay, the metadata attribute from the metadata structure; utilize the persistently stored metadata attribute to respond to a read request received during the replay by the second storage node; and utilize a write request metadata attribute for executing a write request received during the replay by the second storage node.

In one aspect, the computing technology disclosed by process 682 enables the partner storage system node 108B to maintain accurate metadata attributes while conducting NVLog replay and providing access to one or more storage volumes that are impacted by the NVLog replay. This ensures that the failover operation does not delay access to storage volumes and does not corrupt metadata attributes for I/O operations that are conducted during the replay.

Figure 7:
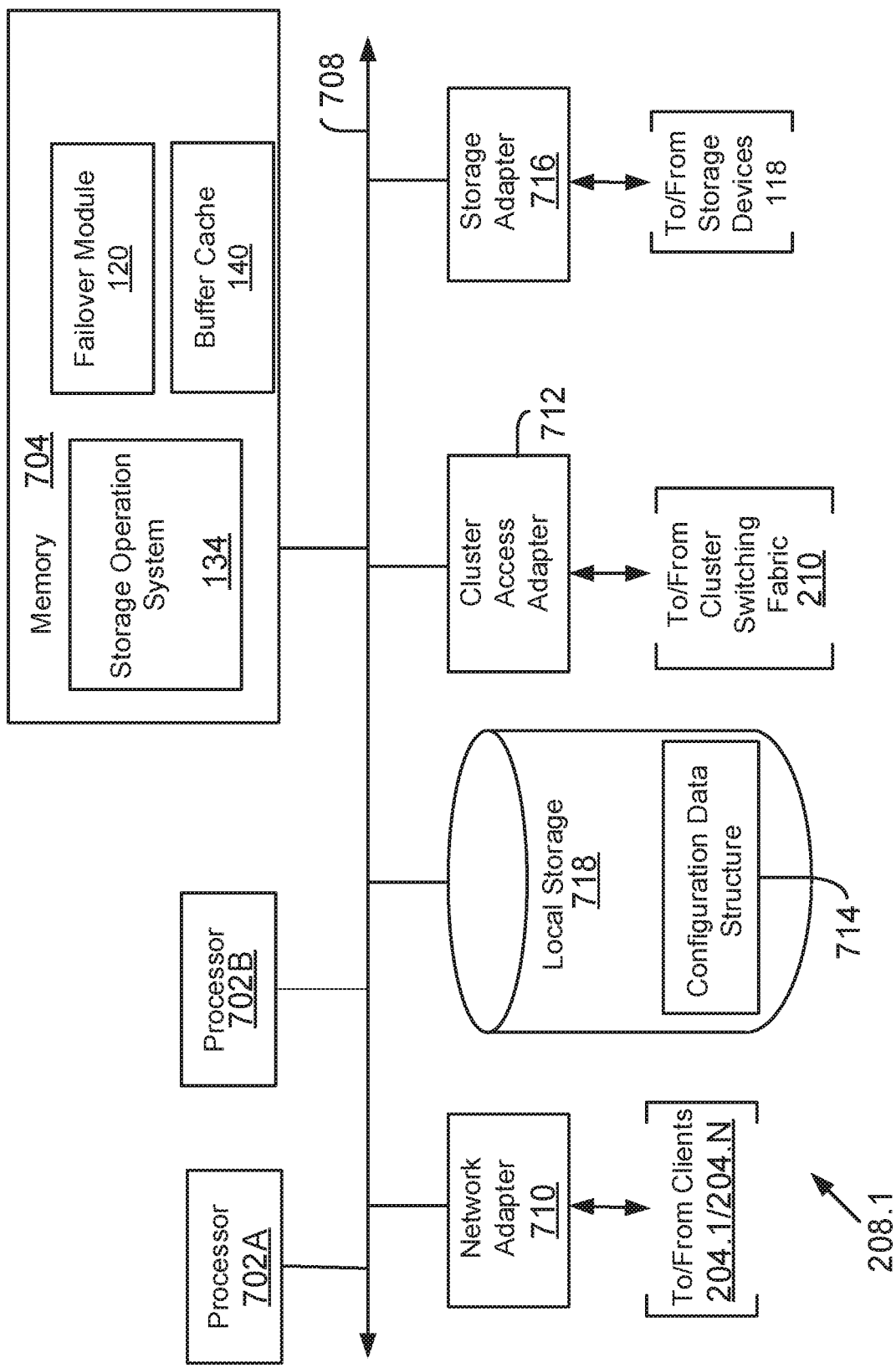
FIG. 7 shows an example of a storage system node, according to aspects of the present disclosure.

Storage System Node:

FIG. 7 is a block diagram of a node 208.1, (including the storage system nodes 108A/108B) that is illustratively embodied as a storage system comprising of a plurality of processors 702A and 702B, a memory 704, a network adapter 710, a cluster access adapter 712, a storage adapter 716 and local storage 718 interconnected by a system bus 708.

Processors 702A-702B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The local storage 718 comprises one or more storage devices utilized by the node to locally store configuration information for example, in a configuration data structure 714.

The cluster access adapter 712 comprises a plurality of ports adapted to couple node 208.1 to other nodes of cluster 202 (FIG. 2A). In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and storage modules are implemented on separate storage systems or computers, the cluster access adapter 712 is utilized by the network/storage module for communicating with other network/storage-modules in the cluster 202.

Each node 208.1 is illustratively embodied as a dual processor storage system executing the failover module 120 for managing a failover operation, and the storage operating system 134 that preferably implements a high-level module, such as a file system 240, to logically organize the information as a hierarchical structure of named directories and files at storage 118. However, it will be apparent to those of ordinary skill in the art that the node 208.1 may alternatively comprise a single or more than two processor systems. Illustratively, one processor 702A executes the functions of the network module on the node, while the other processor 702B executes the functions of the storage module.

The memory 704 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 134 portions of which is typically resident in memory and executed by the processing elements, functionally organizes the node 208.1 by, inter alia, invoking storage operation in support of the storage service implemented by the node.

In one aspect, data that needs to be written is first stored at a buffer cache 140 in memory 704. The written data is moved to NVRAM storage, stored at a partner NVRAM (FIG. 1B) and then stored persistently at storage devices 118 during a CP operation.

The network adapter 710 comprises a plurality of ports adapted to couple the node 208.1 to one or more clients 204.1/204.N over point-to-point links, wide area networks, virtual private networks implemented over a public network (Internet) or a shared local area network. The network adapter 710 thus may comprise the mechanical, electrical and signaling circuitry needed to connect the node to the network. Each client 204.1/204.N may communicate with the node over network 206 (FIG. 2A) by exchanging discrete frames or packets of data according to pre-defined protocols, such as TCP/IP.

The storage adapter 716 cooperates with the storage operating system 134 executing on the node 208.1 to access information requested by the clients. The information may be stored on any type of attached array of writable storage device media such as hard drives, solid state drivers, storage class memory, video tape, optical, DVD, magnetic tape, bubble memory, electronic random access memory, micro-electro mechanical and any other storage media adapted to store information, including data and parity information. However, as illustratively described herein, the information is preferably stored at storage device 118.1. The storage adapter 716 comprises a plurality of ports having input/output (I/O) interface circuitry that couples to the storage devices over an I/O interconnect arrangement, such as a conventional high-performance, Fibre Channel link topology.

Figure 8:
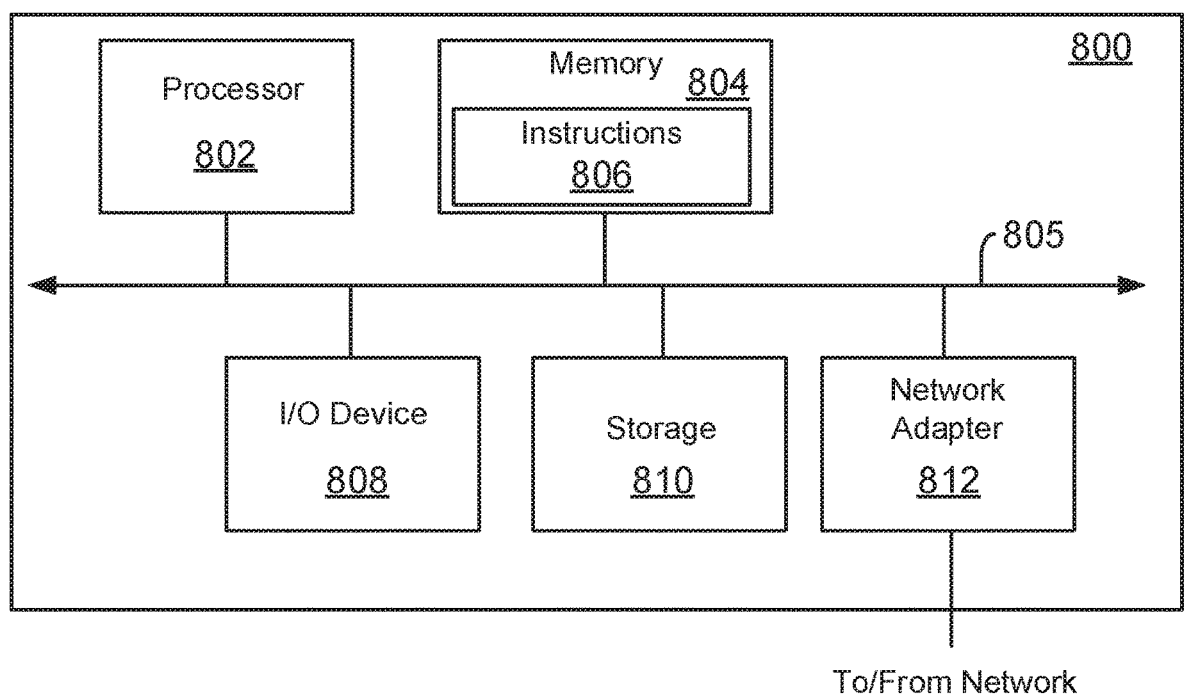
FIG. 8 shows an example of a processing system, used according to aspects of the present disclosure.

Processing System:

FIG. 8 is a high-level block diagram showing an example of the architecture of a processing system 800 that may be used according to one aspect. The processing system 800 can represent storage system node 108, host system 102, management console 132, or clients 116, 204. Note that certain standard and well-known components which are not germane to the present aspects are not shown in FIG. 8.

The processing system 800 includes one or more processor(s) 802 and memory 804, coupled to a bus system 805. The bus system 805 shown in FIG. 8 is an abstraction that represents any one or more separate physical buses and/or point-to-point connections, connected by appropriate bridges, adapters and/or controllers. The bus system 805, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 802 are the central processing units (CPUs) of the processing system 800 and, thus, control its overall operation. In certain aspects, the processors 802 accomplish this by executing software stored in memory 804. The processors 802 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 804 represents any form of random-access memory (RAM), read-only memory (ROM), flash memory, or the like, or a combination of such devices. Memory 804 includes the main memory of the processing system 800. Instructions 806 may be used to implement the filtering data structure 512, metadata structure 518, the location data structure 536, the metafile 550, the hash data structure 558 and the process steps of FIGS. 6A-6H described above, may reside in and executed (by processors 802) from memory 804.

Also connected to the processors 802 through the bus system 805 are one or more internal mass storage devices 810, and a network adapter 812. Internal mass storage devices 810 may be or may include any conventional medium for storing large volumes of data in a non-volatile manner, such as one or more magnetic or optical based disks, solid state drives, or any other storage media. The network adapter 812 provides the processing system 800 with the ability to communicate with remote devices (e.g., storage servers) over a network and may be, for example, an Ethernet adapter, a Fibre Channel adapter, or the like.

The processing system 800 also includes one or more input/output (I/O) devices 808 coupled to the bus system 805. The I/O devices 808 may include, for example, a display device, a keyboard, a mouse, etc.

Cloud Computing:

The system and techniques described above are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, is a cloud platform and cloud infrastructure, followed by a "server" layer that includes hardware and computer software designed for cloud specific services, for example, the storage system 108 is accessible as a cloud service. Details regarding these layers are not germane to the embodiments disclosed herein.

Thus, methods and systems for efficiently managing a failover operation in a networked storage environment have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
   generating by a processor of a second storage node, a filtering data structure and a metadata structure before starting a replay of entries of a log stored at a non-volatile memory of the second storage node for a failover operation initiated in response to a failure at a first storage node, the second storage node operating as a partner node of the first storage node to mirror at the non-volatile memory, one or more write requests and data associated with the one or more write requests received by the first storage node prior to the failure, wherein the filtering data structure identifies the entries, and the metadata structure stores a metadata attribute of data containers associated with the entries;
   updating by the processor, before the replay, a location data structure indicating storage locations of the non-volatile memory that store the data associated with the write requests received by the first storage node prior to the failure and mirrored at the non-volatile memory; and
   utilizing by the processor, the filtering data structure, the metadata structure and the location data structure for providing access to a logical storage object for processing an input/output ("I/O") request received during the replay of the entries by the second storage node.

2. The method of claim 1, further comprising: identifying from the filtering data structure by the processor, a data container and an offset value associated with each write request mirrored at the log of the second storage node after receipt by the first storage node prior to the failure.

3. The method of claim 1, further comprising: storing in the metadata structure, one or more attributes of a data container associated with each write request mirrored at the log of the second storage node after receipt by the rst storage node prior to the failure.

4. The method of claim 1, further comprising: identifying from the location data structure by the processor, a data container and a location of the non-volatile memory where data is stored for each write request mirrored at the log of the second storage node after receipt by the first storage node prior to the failure.

5. The method of claim 1, further comprising: storing in the metadata structure by the processor, a data container modification time of data containers associated with the entries of the log of the second storage node.

6. The method of claim 5, wherein before the replay, the data container modification time is persistently stored.

7. The method of claim 1, further comprising: after the replay is completed, removing by the processor, any entry added in the location data structure during the updating of the location data structure.

8. A non-transitory machine readable medium having stored thereon instructions comprising machine executable code which when executed by a machine, causes the machine to:
   generate a filtering data structure and a metadata structure, before starting a replay of entries of a log stored at a non-volatile memory of a second storage node for a failover operation initiated in response to a failure at a first storage node, the second storage node operating as a partner node of the first storage node to mirror at the non-volatile memory, one or more write requests and data associated with the one or more write requests received by the first storage node prior to the failure, wherein the filtering data structure identifies the entries, and the metadata structure stores a metadata attribute of data containers associated with the entries; and
   utilize the filtering data structure and the metadata structure for providing access to a logical storage object for processing an input/output ("I/O") request received during the replay of the entries by the second storage node.

9. The non-transitory machine readable medium of claim 8, wherein the machine executable code further causes the machine to: identify from the filtering data structure, a data container and a data container offset value associated with each write request mirrored at the log of the second storage node after receipt by the first storage node prior to the failure.

10. The non-transitory machine readable medium of claim 8, wherein the machine executable code further causes the machine to: store in the metadata data structure, one or more attributes of a data container associated with each write request mirrored at the log of the second storage node after receipt by the first storage node prior to the failure.

11. The non-transitory machine readable medium of claim 8, wherein the machine executable code further causes the machine to: update before the replay, a location data structure indicating storage locations of the non-volatile memory that store data associated with each write request mirrored at the log of the second storage node after receipt by the first storage node prior to the failure.

12. The non-transitory machine readable medium of claim 11, wherein the machine executable code further causes the machine to: identify from the location data structure, a data container and a location of the non-volatile memory where data is stored for each write request mirrored at the log of the second storage node after receipt by the first storage node prior to the failure.

13. The non-transitory machine readable medium of claim 11, wherein the machine executable code further causes the machine to: after the replay is completed, remove any entry added in the location data structure during the update of the location data structure.

14. The non-transitory machine readable medium of claim 8, wherein the machine executable code further causes the machine to: store in the metadata structure, a data container modification time of each data container that has an associated entry at the log, and the modification time is persistently stored before the replay begins.

15. A system, comprising:
a memory containing machine readable medium comprising machine executable code having stored thereon instructions; and a processor coupled to the memory to execute the machine executable code to:
generate a filtering data structure and a metadata structure, before starting a replay of entries of a log stored at a non-volatile memory of a second storage node for a failover operation initiated in response to a failure at a first storage node, the second storage node operates as a partner node of the first storage node to mirror at the non-volatile memory, one or more write requests and data associated with the one or more write requests received by the first storage node prior to the failure, wherein the filtering data structure identifies the entries, and the metadata structure stores a metadata attribute of data containers associated with the entries; and
utilize the filtering data structure and the metadata structure for providing access to a logical storage object for processing an input/output ("I/O") request received during the replay of the entries by the second storage node.

16. The system of claim 15, wherein the processor further causes the machine executable code to: identify from the filtering data structure, a data container and a data container offset value associated with each write request mirrored at the log of the second storage node after receipt by the first storage node prior to the failure.

17. The system of claim 15, wherein the processor further causes the machine executable code to: store in the metadata structure, one or more attributes of a data container associated with each write request mirrored at the log of the second storage node after receipt by the first storage node prior to the failure.

18. The system of claim 15, wherein the processor further causes the machine executable code to: update before the replay, a location data structure indicating storage locations of the non-volatile memory that store data associated with each write request mirrored at the log of the second storage node after receipt by the first storage node prior to the failure.

19. The system of claim 18, wherein the processor further causes the machine executable code to: identify from the location data structure, a data container and a location of the non-volatile memory where data is stored for each write request mirrored at the log of the second storage node after receipt by the first storage node prior to the failure.

20. The system of claim 15, wherein the processor further causes the machine executable code to: store in the metadata structure, a data container modification time of each data container that has an associated entry at the log and the modification time is persistently stored before the replay begins.

* * * * *